US012694554B2

(12) United States Patent
Nadig et al.

(10) Patent No.: US 12,694,554 B2
(45) Date of Patent: Jul. 28, 2026

(54) ACCURATELY SENSING SURFACE TEMPERATURES USING THERMAL NOISE AT COMPUTING DEVICES

(71) Applicant: Google LLC, Mountain View, CA (US)

(72) Inventors: Sachin Prakash Nadig, San Francisco, CA (US); Isaac Chase Novet, Escondido, CA (US)

(73) Assignee: GOOGLE LLC, Mountain View, CA (US)

( * ) Notice: Subject to any disclaimer, the term of this patent is extended or adjusted under 35 U.S.C. 154(b) by 675 days.

(21) Appl. No.: 18/166,295

(22) Filed: Feb. 8, 2023

(65) Prior Publication Data

US 2024/0201027 A1     Jun. 20, 2024

Related U.S. Application Data

(60) Provisional application No. 63/433,225, filed on Dec. 16, 2022.

(51) Int. Cl.
G06T 7/64       (2017.01)
G01K 1/143      (2021.01)

(52) U.S. Cl.
CPC .............. G06T 7/64 (2017.01); G01K 1/143 (2013.01); *G06T 2207/30188* (2013.01)

(58) Field of Classification Search
CPC .......... G01K 7/30; G01K 1/143; G01K 13/20; A61B 5/01; A61B 5/6802; A61B 5/7225; A61B 5/7228; A61B 5/7246; A61B 5/7257
See application file for complete search history.

(56) References Cited

U.S. PATENT DOCUMENTS

| | | | |
|---|---|---|---|
| 5,746,511 A | 5/1998 | Eryurek et al. | |
| 2013/0022075 A1* | 1/2013 | Pape .................... | G01K 15/005 |
| | | | 374/1 |
| 2018/0152195 A1* | 5/2018 | Lelong ................ | H03M 1/0626 |
| 2018/0299333 A1 | 10/2018 | Bramley | |
| 2022/0079519 A1 | 3/2022 | Jirik | |

OTHER PUBLICATIONS

E. Ghaderi and B. Bahreyni, "Synchronous Demodulation for Low Noise Measurements," in IEEE Instrumentation & Measurement Magazine, vol. 24, No. 2, pp. 72-78, Apr. 2021 (Year: 2021).*

(Continued)

*Primary Examiner* — Eric F Winakur
*Assistant Examiner* — Sienna C Pyle
(74) *Attorney, Agent, or Firm* — DORITY & MANNING P.A.

(57)     ABSTRACT

A known signal is sent to a resistor of a mobile computing device, wherein the resistor directly contacts a surface. A signal is from the resistor, wherein the signal comprises the known signal and a degree of thermal noise from the resistor, and wherein the degree of thermal noise is associated with a temperature of the surface. The thermal noise is extracted from the signal from the resistor. The temperature of the surface is determined based on the thermal noise extracted from the signal from the resistor.

20 Claims, 12 Drawing Sheets

(56)  References Cited

OTHER PUBLICATIONS

Bramley et al., "The Development of a Practical, Drift-Free, Johnson-Noise Thermometer for Industrial Applications.", International Journal of Physics, vol. 38, Dec. 14, 2016, 15 pages.

Kisner et al., "Development of a Johnson Noise Thermometer for Nuclear Power Use.", Mar. 2005, https://www.ornl.gov/~webworks/cppr/v2001/rpt/123064.pdf, retrieved on Oct. 10, 2023, 94 pages.

Zhang., "An Integrated Circuit Solution to Johnson Noise Thermometry and High-Speed Three-stage Amplifier Design.", 2019, chrome-extension://efaidnbmnnnibpcajpcglclefindmkaj/https://dr.lib.iastate.edu/server /api/core/bitstreams/c24cfc70-f241-42b4-bd9f-a5e2cd8ca514/content, retrieved on Oct. 10, 2023, 125 pages.

International Preliminary Report on Patentability for Application No. PCT/US2023/084363, mailed Jun. 26, 2025, 7 pages.

International Search Report and Written Opinion for Application No. PCT/US2023/084363, mailed Mar. 20, 2024, 11 pages.

* cited by examiner

12:58 AM

SENSED BODY TEMPERATURE

HEALTH IMPROVEMENT RECOMMENDATION(S)

504

510

508

NETWORK(S)
506

SMART SYSTEM(S)
512

102

140

142
104

136

106

108

100

500

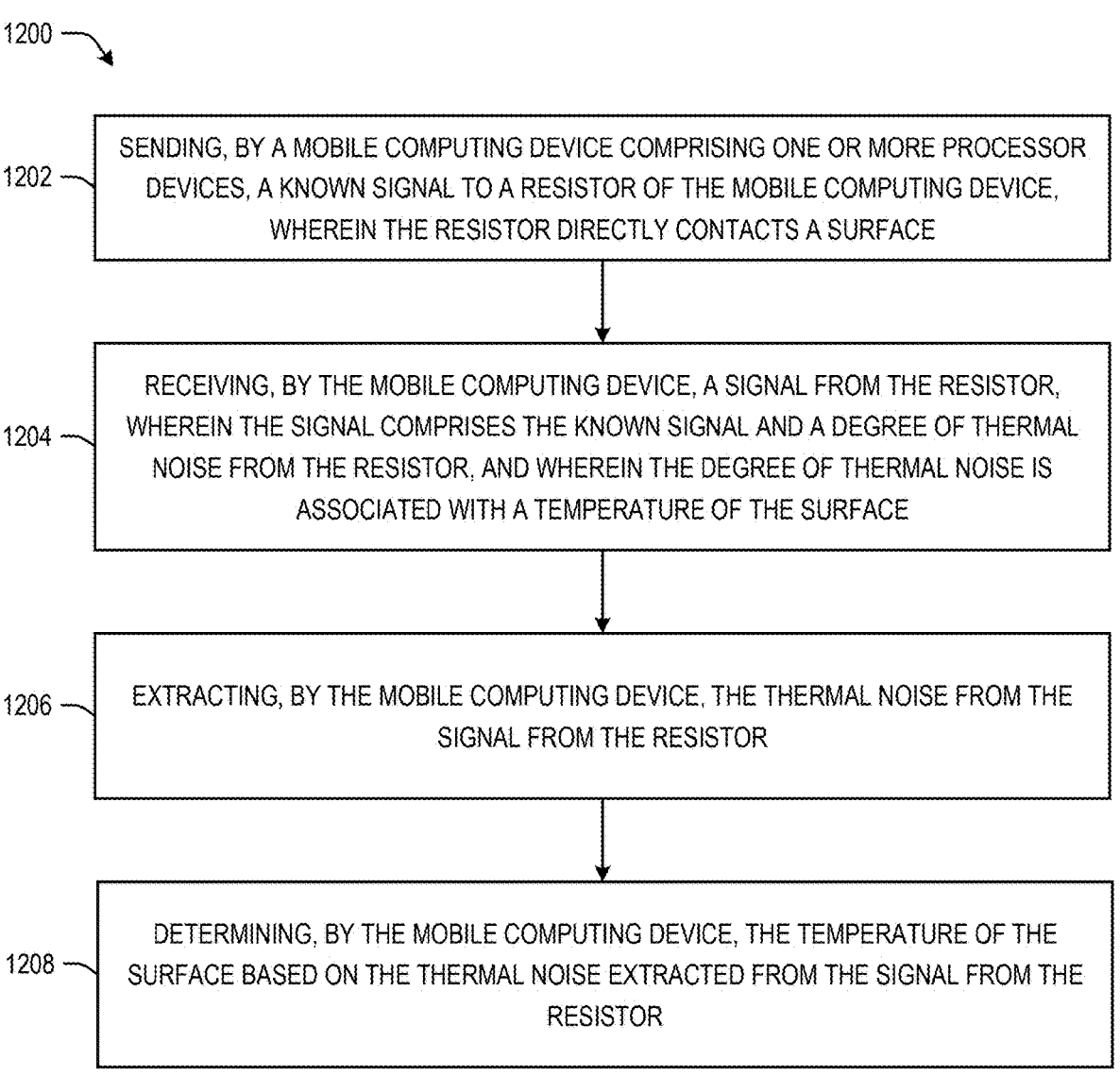

1200

1202 — SENDING, BY A MOBILE COMPUTING DEVICE COMPRISING ONE OR MORE PROCESSOR DEVICES, A KNOWN SIGNAL TO A RESISTOR OF THE MOBILE COMPUTING DEVICE, WHEREIN THE RESISTOR DIRECTLY CONTACTS A SURFACE

1204 — RECEIVING, BY THE MOBILE COMPUTING DEVICE, A SIGNAL FROM THE RESISTOR, WHEREIN THE SIGNAL COMPRISES THE KNOWN SIGNAL AND A DEGREE OF THERMAL NOISE FROM THE RESISTOR, AND WHEREIN THE DEGREE OF THERMAL NOISE IS ASSOCIATED WITH A TEMPERATURE OF THE SURFACE

1206 — EXTRACTING, BY THE MOBILE COMPUTING DEVICE, THE THERMAL NOISE FROM THE SIGNAL FROM THE RESISTOR

1208 — DETERMINING, BY THE MOBILE COMPUTING DEVICE, THE TEMPERATURE OF THE SURFACE BASED ON THE THERMAL NOISE EXTRACTED FROM THE SIGNAL FROM THE RESISTOR

FIG. 12

ACCURATELY SENSING SURFACE TEMPERATURES USING THERMAL NOISE AT COMPUTING DEVICES

PRIORITY CLAIM

This application is based upon and claims the benefit of U.S. Provisional Patent Application No. 63/433,225, having a filing date of Dec. 16, 2022, and which is incorporated by reference herein in its entirety.

FIELD

The present disclosure relates generally to determining the temperature of a surface. More particularly, the present disclosure relates to using thermal noise to accurately sense the temperature of a surface contacting a computing device (e.g., a wearable computing device).

BACKGROUND

Generally, computing devices (e.g., smartphones, smart watches, wireless earbuds, Augmented Reality (AR)/Virtual Reality (VR) devices, etc.) include a variety of sensors to determine the state of the environment surrounding the computing device. For example, some computing devices, such as smartphones include infrared sensors to determine a degree of ambient light in the environment. For another example, some computing devices, such as wireless earbuds, include microphones to detect (or actively cancel) ambient noise in the environment. For yet another example, some computing devices include sensors to collect a variety of biometric data for a user wearing the computing device.

SUMMARY

Aspects and advantages of embodiments of the present disclosure will be set forth in part in the following description, or can be learned from the description, or can be learned through practice of the embodiments.

One example aspect of the present disclosure is directed to a method. The method includes sending, by a mobile computing device comprising one or more processor devices, a known signal to a resistor of the mobile computing device, wherein the resistor directly contacts a surface. The method includes receiving, by the mobile computing device, a signal from the resistor, wherein the signal comprises the known signal and a degree of thermal noise from the resistor, and wherein the degree of thermal noise is associated with a temperature of the surface. The method includes extracting, by the mobile computing device, the thermal noise from the signal from the resistor. The method includes determining, by the mobile computing device, the temperature of the surface based on the thermal noise extracted from the signal from the resistor.

Another example aspect of the present disclosure is directed to a computing system. The computing system includes a resistor, one or more processors; and one or more computer-readable media that collectively store instructions that, when executed by the one or more processors, cause the computing system to perform operations. The operations include sending a known signal to the resistor, wherein the resistor directly contacts a surface. The operations include receiving a signal from the resistor, wherein the signal comprises the known signal and a degree of thermal noise from the resistor, and wherein the degree of thermal noise is associated with a temperature of the surface. The operations include extracting the thermal noise from the signal from the resistor. The operations include determining the temperature of the surface based on the thermal noise extracted from the signal from the resistor.

Another example aspect of the present disclosure is directed to one or more computer-readable media that collectively store instructions that, when executed by one or more processors of a wearable computing device, cause the wearable computing device to perform operations. The operations include sending a known signal to a resistor, wherein the resistor directly contacts a surface. The operations include receiving a signal from the resistor, wherein the signal comprises the known signal and a degree of thermal noise from the resistor, and wherein the degree of thermal noise is associated with a temperature of the surface. The operations include extracting the thermal noise from the signal from the resistor. The operations include determining the temperature of the surface based on the thermal noise extracted from the signal from the resistor.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 12 depicts a flow chart diagram of an example method to perform according to example embodiments of the present disclosure.

Figure 1:
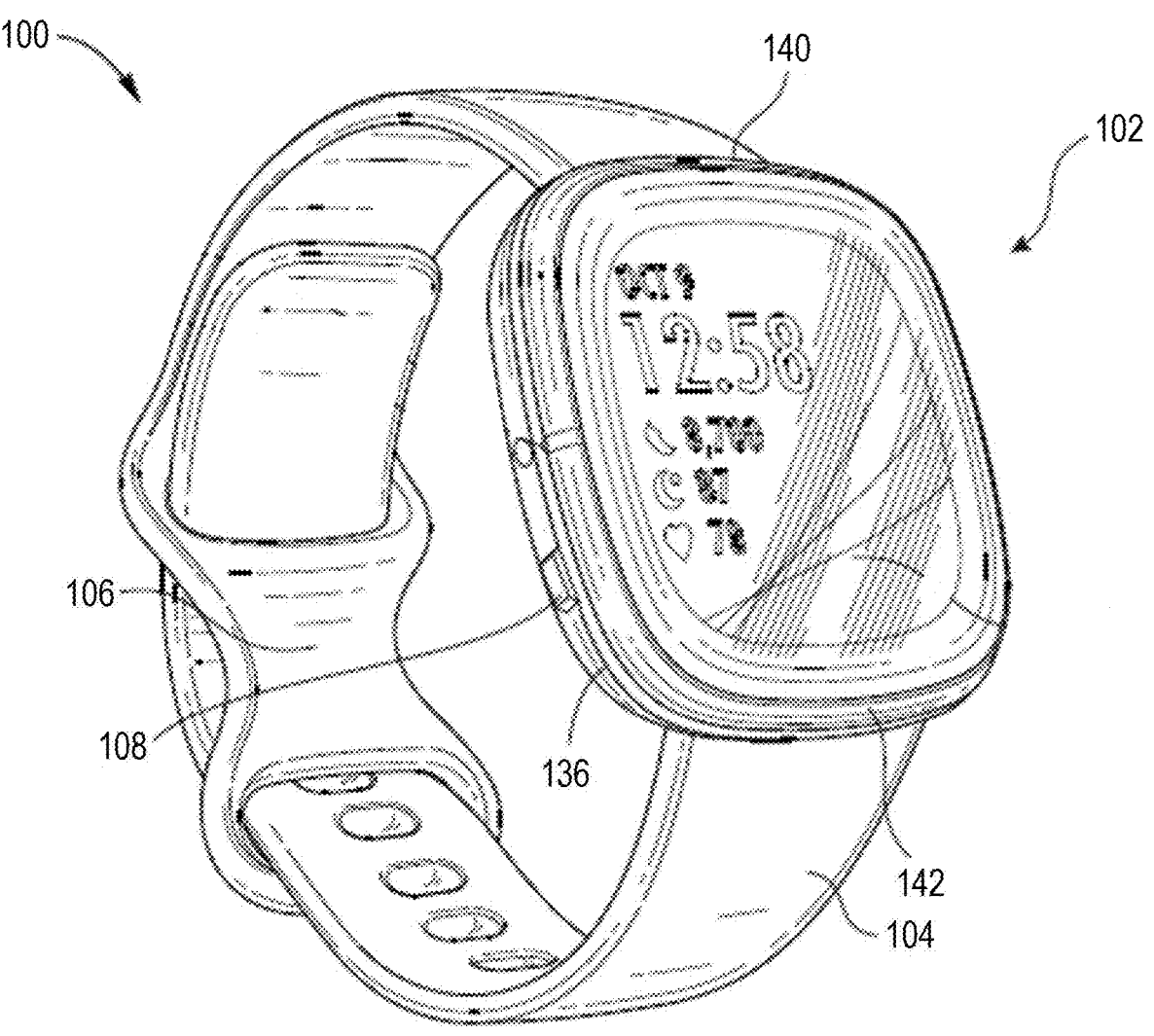
FIGS. 1, 2, and 3 each illustrate a perspective view of an example, non-limiting wearable device according to one or more example embodiments of the present disclosure.

Reference numerals that are repeated across plural figures are intended to identify the same features in various implementations.

DETAILED DESCRIPTION

Overview

Generally, the present disclosure is directed to determining the temperature of a surface. More particularly, the present disclosure relates to using thermal noise to accurately sense the temperature of a surface contacting a computing device (e.g., a wearable computing device. Mobile computing devices, such as smart watches, generally offer health features to users that require the collection of biometric data for the user. For example, some smart watches include sensors to measure a user's pulse throughout the day. In particular, one of the most important biometric data markers for health features is the temperature of the user. Accurately determining a user's temperature allows mobile computing devices to alert the user to the occurrence of a variety of health conditions that can cause temperature fluctuations. However, conventional temperature sensors that can feasibly be included in mobile computing devices are known to be prohibitively inaccurate, and as such, many mobile computing devices do not offer temperature sensing features for users.

Accordingly, implementations of the present disclosure propose techniques to accurately sense the temperature of a surface, such as the skin of a user of a wearable computing device. For example, a mobile computing device (e.g., a smart watch, wireless earbuds, etc.) can be contacting a surface (e.g., the skin of a user, a surface in a room in which the user is located, etc.). The mobile computing device can send a known signal (e.g., a known pseudo-random noise, etc.) to a resistor directing contacting the surface. The temperature of the surface contacting the resistor causes a measurable degree of thermal noise at the resistor (i.e., Johnson noise). As such, the mobile computing device can receive a signal from the resistor that includes the known signal and thermal noise associated with the temperature of the surface. The mobile computing device can extract the thermal noise from the known signal, and can accurately and efficiently determine the temperature of the surface based on the thermal noise extracted from the signal.

Aspects of the present disclosure provide a number of technical effects and benefits. As an example, as described previously, conventional mobile computing devices generally lack the capacity to accurately sense the temperature of a surface, or to sense surface temperature whatsoever. Without the ability to accurately sense the temperature of a surface, conventional devices cannot provide critical health features that can ensure the health and safety of a user. Accordingly, aspects of the present disclosure propose techniques for accurate and efficient sensing of surface temperature by a mobile computing device. By accurately sensing the temperature of a surface, such as the temperature of a user, the mobile computing device can alert the user, or health providers, when abnormal surface temperatures are detected, thus minimizing the risk posed when temperature-related health conditions go unnoticed (e.g., hypothermia, fever, hyperthermia, etc.).

As another example, devices that do offer temperature sensing often sacrifice form, or compute resources (e.g., battery life, compute cycles, memory, storage, etc.) to sense the temperature of a surface. However, by measuring the thermal noise at a resistor contacting a surface, implementations of the present disclosure can efficiently and accurately measure the temperature of the surface while expending minimal compute resources and without requiring significant alterations to the form of a mobile device. As such, implementations of the present disclosure can substantially reduce the utilization of computing resources required for sensing of surface temperatures.

With reference now to the Figures, example embodiments of the present disclosure will be discussed in further detail.

Example Devices and Systems

In one or more embodiments, the computing device described above and below according to example embodiments of the present disclosure can constitute, include, be coupled to, and/or otherwise be associated with one or more computing devices and/or computing systems described below and illustrated in the example embodiments depicted in FIGS. 1, 2, 3, 4, 5, and/or 6. For example, in at least one embodiment, the computing device described above and below according to example embodiments of the present disclosure can constitute, include, be coupled to, and/or otherwise be associated with wearable device 100, 100*a*, 100*b*, and/or 100*c*, external computing device 504, 504*a*, 504*b*, and/or 504*c*, and/or server system 604.

Figure 2:
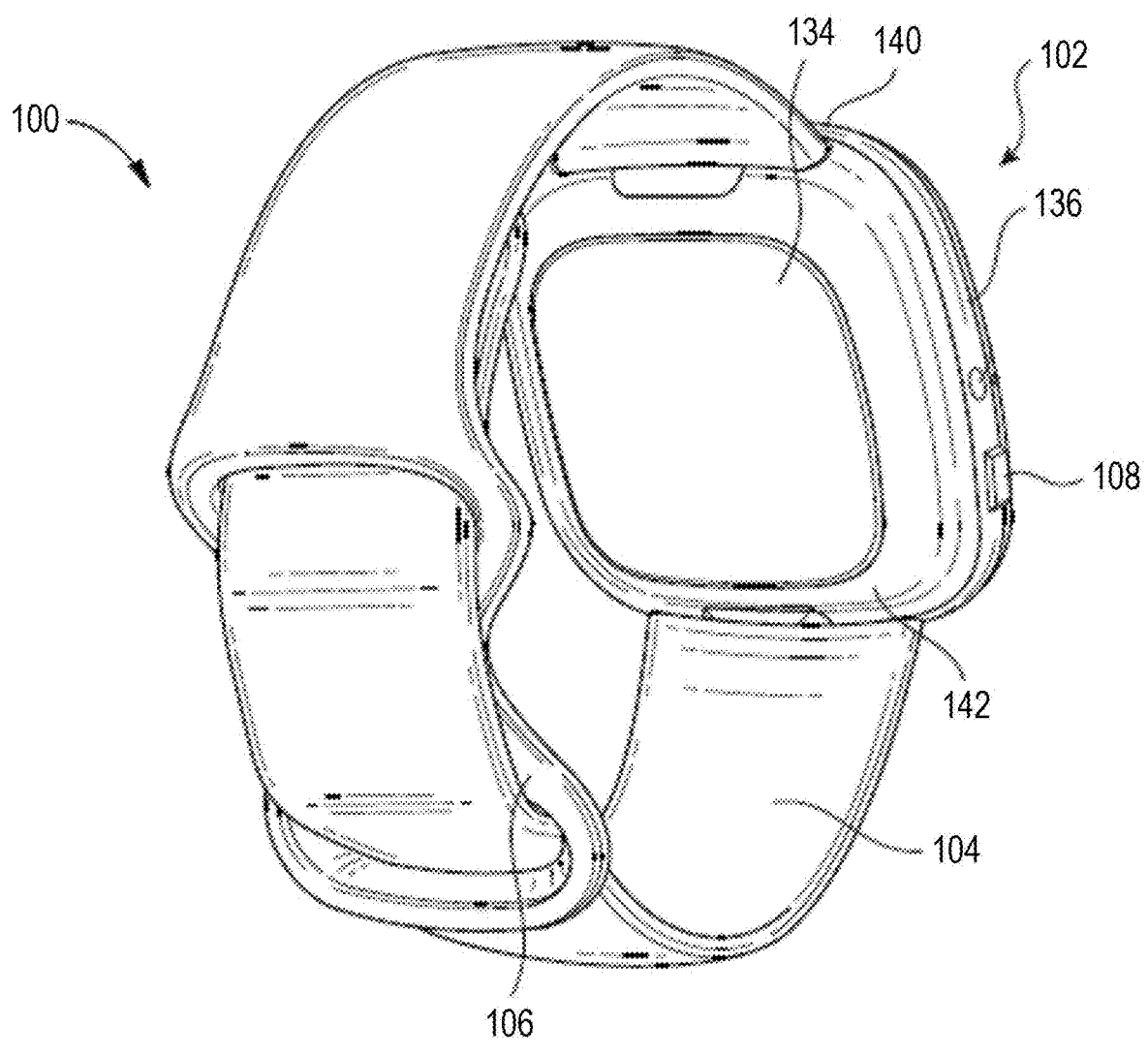
Figure 3:
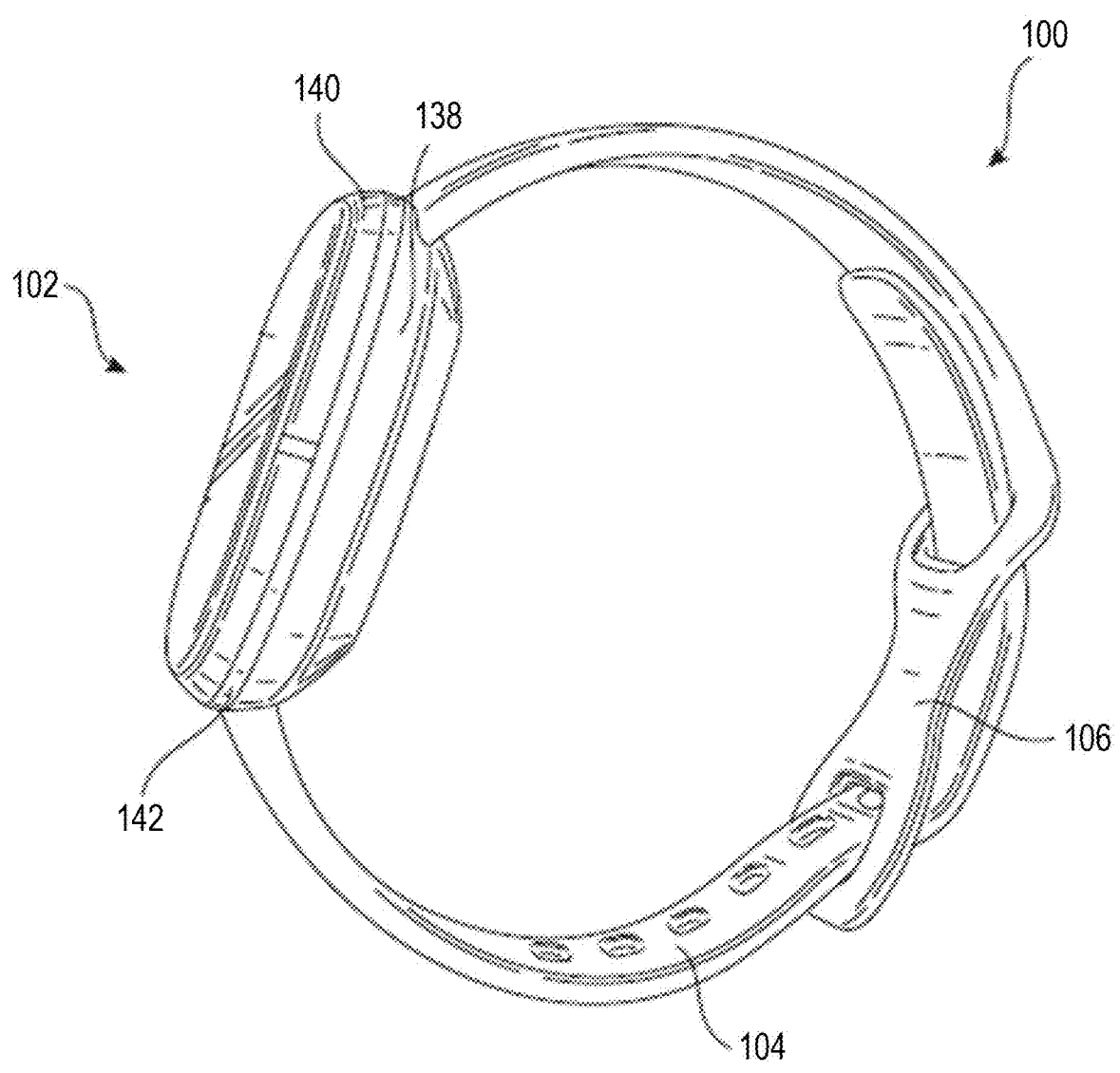

FIGS. 1, 2, and 3 each illustrate a perspective view of an example, non-limiting wearable device 100 according to one or more example embodiments of the present disclosure. In example embodiments described herein, wearable device 100 can constitute and/or include a wearable computing device. For instance, in these or other example embodiments, wearable device 100 can constitute and/or include a wearable computing device such as, for example, a wearable physiological monitoring device that can be worn by a user (also referred to herein as a "wearer") and/or capture one or more types of physiological data of the user (e.g., heart rate (HR) data, motion data (e.g., accelerometer data), body temperature data, respiration rate data, blood pressure data, blood oxygenation level data, deoxyribonucleic acid (DNA) data, electrodermal activity (EDA) data, stress related data).

Wearable device 100 according to example embodiments of the present disclosure can include a display 102, an attachment component 104, a securement component 106, and a button 108 that can be located on a side of wearable device 100. In at least one embodiment, two sides of display 102 can be coupled (e.g., mechanically, operatively) to attachment component 104. In some embodiments, securement component 106 can be located on, coupled to (e.g., mechanically, operatively), and/or integrated with attachment component 104. In these or other embodiments, securement component 106 can be positioned opposite display 102 on an opposing end of attachment component 104. In some embodiments, button 108 can be located on a side of wearable device 100, underneath display 102.

Display 102 according to example embodiments described herein can constitute and/or include any type of electronic display or screen known in the art. For example, in some embodiments, display 102 can constitute and/or include a liquid crystal display (LCD) or organic light emitting diode (OLED) display such as, for instance, a transmissive LCD display or a transmissive OLED display. Display 102 according to example embodiments can be configured to provide brightness, contrast, and/or color saturation features according to display settings that can be maintained by control circuitry and/or other internal components and/or circuitry of wearable device 100. In some embodiments, display 102 can constitute and/or include a touchscreen such as, for instance, a capacitive touchscreen. For example, in these embodiments, display 102 can constitute and/or include a surface capacitive touchscreen or a projective capacitive touch screen that can be configured to respond to contact with electrical charge-holding members or tools, such as a human finger.

In some embodiments, display 102 can be configured to provide (e.g., render) a variety of information such as, for example, the time, the date, body signals (e.g., physiological data of a user wearing wearable device 100), readings based upon user input, and/or other information. In one embodiment, such body signals can include, but are not limited to, heart rate data (e.g., heart beats per minute), motion data (e.g., movement data, accelerometer data), blood pressure data, body temperature data, respiration rate data, blood oxygenation level data, deoxyribonucleic acid (DNA) data, electrodermal activity (EDA) data, stress related data and/or any other body signal that one of ordinary skill in the art would understand that can be measured by a wearable device such as, for instance, wearable device 100. In some embodiments, the readings based upon user input can include, but are not limited to, the number of steps a user has taken, the distance traveled by the user, the sleep schedule of the user, travel routes of the user, elevation climbed by the user, and/or any other metric that one of ordinary skill in the art would understand that can be input by a user into a wearable device such as, for instance, wearable device 100.

In at least one embodiment of the present disclosure, the above-described body signals and/or readings based upon user input can be used to calculate further analytics to provide a user with data such as, for instance, a fitness score, a sleep quality score, a number of calories burned by the user, and/or other data. In some embodiments, wearable device 100 can take in (e.g., capture, collect, receive, measure) outside data irrespective of the user such as, for example: an ambient temperature of an environment surrounding and/or external to wearable device 100; an amount of sun exposure wearable device 100 is subjected to; an atmospheric pressure of the environment surrounding and/or external to wearable device 100; an air quality of the environment surrounding and/or external to wearable device 100; the location of wearable device 100 based on, for instance, a global positioning system (GPS); and/or other outside factors that one of ordinary skill in the art would understand a wearable device such as, for instance, wearable device 100 can take in (e.g., capture, collect, receive, measure).

Attachment component 104 according to example embodiments described herein can be used to attach (e.g., affix, fasten) wearable device 100 to a user of wearable device 100. In some embodiments, attachment component 104 can take the form of, for example, a strap, an elastic band, a rope, and/or any other form of attachment one of ordinary skill in the art would understand can be used to attach a wearable device such as, for instance, wearable device 100 to a user.

Securement component 106 according to example embodiments of the present disclosure can facilitate attachment of attachment component 104 upon a user of wearable device 100. In some embodiments, securement component 106 can include, but is not limited to, a pin and hole locking mechanism (e.g., a buckle), a magnet system, a lock, a clip, and/or any other type of securement that one of ordinary skill would understand can be used to facilitate attachment of a wearable device such as, for instance, wearable device 100 to a user. In one embodiment, wearable device 100 does not include securement component 106. For example, in this or another embodiment, wearable device 100 can be secured to a user with a strap that can be tied around the user's wrist and/or another suitable appendage.

Button 108 according to example embodiments described herein can allow for a user to interact with wearable device 100 and/or allow for the user to provide a form of input into wearable device 100. In the example embodiment depicted in FIGS. 1, 2, and 3, one button 108 is shown on wearable device 100. However, it should be appreciated that wearable device 100 is not so limiting. For example, in some embodiments, wearable device 100 can include any number of buttons that allow a user to further interact with wearable device 100 and/or to provide alternative inputs. In at least one embodiment, wearable device 100 does not include button 108. For instance, as described above, in example embodiments, wearable device 100 can include a screen such as, for example, a touch screen that can receive inputs through (e.g., by way of) the touch of the user. In additional or alternative embodiments, wearable device 100 can include a microphone that can receive inputs through (e.g., by way of) voice commands of a user.

In some embodiments, wearable device 100 can constitute a portable computing device that can be designed so that it can be inserted into a wearable case (e.g., as illustrated in the example embodiments depicted in FIGS. 1, 2, and 3). In some embodiments, wearable device 100 can constitute a portable computing device that can be designed so that it can be inserted into one or more of multiple different wearable cases (e.g., a wristband case, a belt-clip case, a pendant case, a case configured to be attached to a piece of exercise equipment such as a bicycle). Wearable device 100 according to embodiments described herein can be formed into one or more shapes and/or sizes to allow for coupling to (e.g., secured to, worn, borne by) the body or clothing of a user. In some embodiments, wearable device 100 can constitute a portable computing device that can be designed to be worn in limited manners such as, for instance, a computing device that is integrated into a wristband in a non-removable manner and/or can be intended to be worn specifically on a person's wrist (or perhaps ankle).

Irrespective of configuration, wearable device 100 according to example embodiments of the present disclosure can include one or more physiological and/or environmental sensors (e.g., internal physiological sensor(s) 143, external physiological sensor(s) 145, and/or environmental sensor(s) 155) that can be configured to collect physiological and/or environmental data in accordance with various embodiments disclosed herein. In some embodiments, wearable device 100 can be configured to analyze and/or interpret collected physiological and/or environmental data to perform one or more health, wellness, and/or well-being assessments (e.g., physical, mental, emotional, behavioral, and/or sleep quality assessment(s)) of a user (e.g., a wearer) of wearable device 100 according to one or more embodiments described herein. In additional and/or alternative embodiments, wearable device 100 can be configured to communicate with another computing device or server that can perform such one or more health, wellness, and/or well-being assessments (e.g., physical, mental, emotional, behavioral, and/or sleep quality assessment(s)) of a user (e.g., a wearer) of wearable device 100 according to one or more embodiments described herein.

Wearable device 100 in accordance with one or more example embodiments of the present disclosure can include one or more physiological and/or environmental components and/or modules that can be designed to determine one or more physiological and/or environmental metrics associated with a user (e.g., a wearer) of wearable device 100. In at least one embodiment, such physiological and/or environmental component(s) and/or module(s) can constitute and/or include one or more physiological and/or environmental sensors. For instance, although not depicted in the example embodiments illustrated in FIGS. 1, 2, and 3, in some embodiments, wearable device 100 can include one or more physiological and/or environmental sensors such as, for example, an accelerometer, a heart rate sensor (e.g., photoplethysmography (PPG) sensor), an electrodermal activity (EDA) sensor, a body temperature sensor, an environment temperature sensor, and/or another physiological and/or environmental sensor. In these or other embodiments, such physiological and/or environmental sensor(s) can be disposed on, coupled to, and/or otherwise be associated with an underside and/or a backside (e.g., back 134) of wearable device 100.

In some embodiments, the above-described physiological and/or environmental sensor(s) can be disposed on, coupled to, and/or otherwise be associated with wearable device 100 such that the sensor(s) can be in contact with or substantially in contact with human skin when wearable device 100 is worn by a user. For example, in embodiments where wearable device 100 can be worn on a user's wrist, the physiological and/or environmental sensor(s) can be disposed on, coupled to, and/or otherwise be associated with back 134 that can be substantially opposite display 102 and touching an arm of the user. In one embodiment, the above-described physiological and/or environmental sensor(s) can be disposed on, coupled to, and/or otherwise be associated with an interior or skin-side of wearable device 100 (e.g., a side of wearable device 100 that contacts, touches, and/or faces the skin of the user such as, for instance, back 134 and/or bottom 142). In another embodiment, the physiological and/or environmental sensors can be disposed on one or more sides of wearable device 100, including the skin-side (e.g., back 134, bottom 142) and one or more sides (e.g., first side 136, second side 138, top 140, display 102) of wearable device 100 that face and/or are exposed to the ambient environment (e.g., the external environment surrounding wearable device 100).

By way of example, in one embodiment, the back 134 (e.g., a backplate, a metal backplate, etc.) can be a resistor that directly contacts the skin of a user wearing the wearable device 100. Alternatively, in some implementations, the backplate can be made of a material that can carry thermal noise to a resistor, or can be altered by thermal noise in a manner sufficient to measure thermal noise (e.g., a steel backplate, etc.). More generally, the backplate can be any type or manner of material or component sufficient to facilitate the measurement of thermal noise.

Importantly, although examples herein are illustrated in the context of a smart watch wearable device, implementations of the present disclosure can be any type or manner of computing device that includes, or is communicatively coupled to, a component contacting a surface that is sufficient to measure thermal noise. For example, the computing devices described herein can be, or otherwise include, wireless earbuds that contact the skin of a user's ears. For another example, the computing devices described herein can be a smart thermostat that contacts a wall of a room. For yet another example, the computing device can be a device included in, or communicatively coupled to, a computing system (e.g., a computing system of a vehicle, etc.) that contacts a surface within the environment in which the computing system is located (e.g., the surface of a seat of a vehicle, a windshield of a vehicle, etc.). As such it should be broadly understood that implementations of the present disclosure can be utilized across a wide variety of use-cases in which the accurate and efficient sensing of the temperature of a surface is desired.

Figure 4:
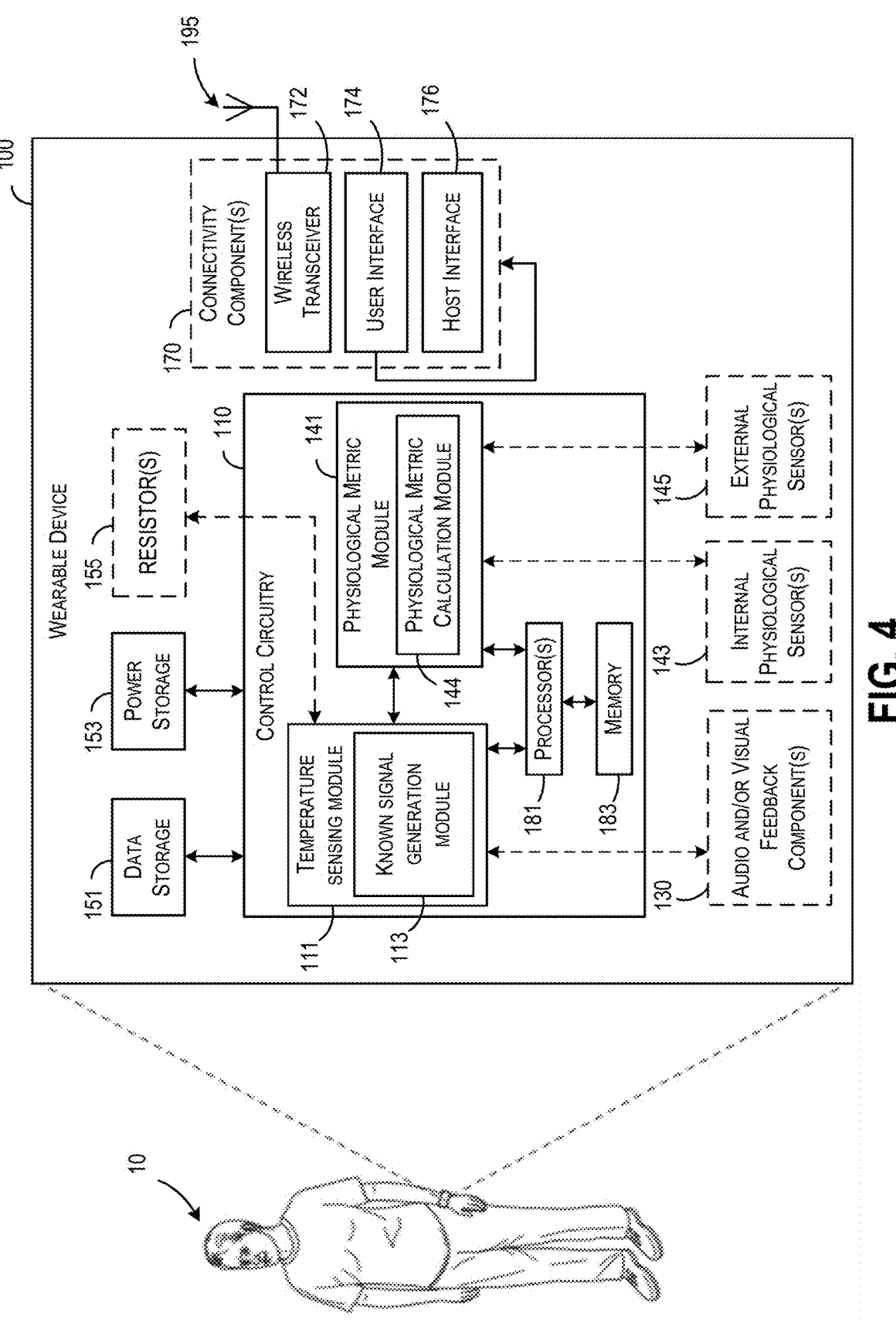
FIG. 4 illustrates a block diagram of the above-described example, non-limiting wearable device according to one or more example embodiments of the present disclosure.

FIG. 4 illustrates a block diagram of the above-described example, non-limiting wearable device 100 according to one or more example embodiments of the present disclosure. That is, for instance, FIG. 4 illustrates a block diagram of one or more internal and/or external components of the above-described example, non-limiting wearable device 100 according to one or more example embodiments of the present disclosure.

As described above with reference to the example embodiments depicted in FIGS. 1, 2, and 3, wearable device 100 can constitute and/or include a wearable computing device such as, for instance, a wearable physiological monitoring device. For example, in the example embodiment depicted in FIG. 4, wearable device 100 can constitute and/or include a wearable physiological monitoring device that can be worn by a user 10 (also referred to herein as a "wearer" or "wearer 10") and/or can be configured to gather data regarding activities performed by user 10 and/or data regarding user's 10 physiological state (e.g., temperature). In this or another embodiment, such data can include data representative of the ambient environment around user 10 or user's 10 interaction with the environment. For example, in some embodiments, the data can constitute and/or include motion data regarding user's 10 movements, ambient light, ambient noise, air quality, and/or physiological data obtained by measuring various physiological characteristics of user 10 (e.g., heart rate, respiratory data, body temperature, blood oxygen levels, perspiration levels, movement data).

Although certain embodiments are disclosed herein in the context of wearable physiological monitoring devices, it should be appreciated that the present disclosure is not so limiting. For example, it should be understood that one or more embodiments can by performed and/or implemented using any suitable or desirable type of computing device or combination of computing devices such as, for example, a client computing device, a laptop, a tablet, a wearable computing device (e.g., wearable device 100), a smartphone, and/or another computing device, whether wearable or not.

As illustrated in FIG. 4, wearable device 100 according to example embodiments of the present disclosure can include one or more audio and/or visual feedback components 130 such as, for instance, electronic touchscreen display units, light-emitting diode (LED) display units, audio speakers, light-emitting diode (LED) lights, buzzers, and/or another type of audio and/or visual feedback module. In certain embodiments, one or more audio and/or visual feedback modules 130 can be located on and/or otherwise associated with a front side of wearable device 100 and/or display 102. For example, in wearable embodiments of wearable device 100, an electronic display such as, for instance, display 102 can be configured to be externally presented to user 10 viewing wearable device 100.

Wearable device 100 according to example embodiments of the present disclosure can include control circuitry 110. Although certain modules and/or components are illustrated as part of control circuitry 110 in the diagram of FIG. 4, it should be understood that control circuitry 110 associated with wearable device 100 and/or other components or devices in accordance with example embodiments of the present disclosure can include additional components and/or circuitry such as, for instance, one or more additional components of the illustrated components depicted in FIG. 4. Furthermore, in certain embodiments, one or more of the illustrated components of control circuitry 110 can be omitted and/or different than that shown in FIG. 4 and described in association therewith.

The term "control circuitry" is used herein according to its broad and/or ordinary meaning and can include any combination of software and/or hardware elements, devices, and/or features that can be implemented in connection with operation of wearable device 100. Furthermore, the term "control circuitry" can be used substantially interchangeably in certain contexts herein with one or more of the terms "controller," "integrated circuit," "IC," "application-specific integrated circuit," "ASIC," "controller chip," or the like.

Control circuitry 110 according to example embodiments of the present disclosure can constitute and/or include one or more processors, data storage devices, and/or electrical connections. In one embodiment, control circuitry 110 can be implemented on a system on a chip (SoC), however, those skilled in the art will recognize that other hardware and/or firmware implementations are possible.

In one or more embodiments of the present disclosure, control circuitry 110 can constitute and/or include one or more processors 181 that can be configured to execute computer-readable instructions that, when executed, cause wearable device 100 to perform one or more operations. In at least one embodiment, control circuitry 110 can constitute and/or include processor(s) 181 that can be configured to execute operational code (e.g., instructions, processing threads, software) for wearable device 100 such as, for instance, firmware or the like. Processor(s) 181 according to example embodiments described herein can each be a processing device. For instance, in the example embodiment depicted in FIG. 4, processor(s) 181 can each be a central processing unit (CPU), microprocessor, microcontroller, integrated circuit (e.g., an application-specific integrated circuit (ASIC)), and/or another type of processing device. In this or another example embodiment, processor(s) 181 can be coupled to (e.g., electrically, communicatively, physically, operatively) to one or more components of control circuitry 110 and/or wearable device 100 such that processor(s) 181 can facilitate one or more operations in accordance with one or more example embodiments described herein.

In at least one embodiment of the present disclosure, the above-described computer-readable instructions and/or operational code that can be executed by processor(s) 181 can be stored in one or more data storage devices of wearable device 100. In the example embodiment depicted in FIG. 4, such computer-readable instructions and/or operational code can be stored in memory 183 of wearable device 100. In this or another example embodiment, memory 183 can be coupled to (e.g., electrically, communicatively, physically, operatively) to one or more components of control circuitry 110 and/or wearable device 100 such that memory 183 can facilitate one or more operations in accordance with one or more example embodiments described herein.

Memory 183 according to example embodiments described herein can store computer-readable and/or computer executable entities (e.g., data, information, applications, models, algorithms) that can be created, modified, accessed, read, retrieved, and/or executed by each of processor(s) 181. In some embodiments, memory 183 can constitute, include, be coupled to (e.g., operatively), and/or otherwise be associated with a computing system and/or media such as, for example, one or more computer-readable media, volatile memory, non-volatile memory, random-access memory (RAM), read only memory (ROM), hard drives, flash drives, and/or other memory devices. In these or other embodiments, such one or more computer-readable media can include, constitute, be coupled to (e.g., operatively), and/or otherwise be associated with one or more non-transitory computer-readable media. Although not depicted in the example embodiment illustrated in FIG. 4, in some embodiments, memory 183 can include (e.g., store) an temperature sensing module 111, and/or other modules and/or data that can be used to facilitate one or more operations described herein.

Control circuitry 110 according to example embodiments of the present disclosure can constitute and/or include temperature sensing module 111. Temperature sensing module 111 according to example embodiments of the present disclosure can constitute and/or include one or more hardware and/or software components and/or features that can be configured to perform temperature sensing for a surface (e.g., the skin of user 10) in accordance with one or more embodiments described herein. For example, in some embodiments, temperature sensing module 111 can constitute and/or include one or more hardware and/or software components and/or features that can be configured to sense the temperature of a surface by measuring the degree of thermal noise caused by the surface to a resistor, or other device.

In particular, temperature sensing module 111 can include, or can be communicatively coupled to, resistor(s) 155. The resistor(s) 155 can be one or more resistors that directly contact the surface of the user 10. The resistor(s) 155 can be or include any type or manner of resistor or electrical conductor (e.g., metal, etc.). The resistor can provide a signal that is measured at the temperature sensing module 111. For example, the temperature sensing module 111 can include a known signal generation module 113. The known signal generation module 113 can send a known signal through the resistor(s) 155. The signal received from the resistor(s) 155 at the temperature sensing module 111 can include the known signal and thermal noise caused at the resistor by the temperature of the surface (e.g., the skin of user 10). The functionality of the temperature sensing module 111 will be discussed in greater detail with regards to FIGS. 7-11.

In some implementations, the known signal generation module 113 can be a pseudo-random noise generator. For example, the known signal generation module 113 can be a digital-to-analog convertor programmed to generate a known power of thermal noise spectrum (i.e., Johnson noise spectrum). The pseudo-random noise can be a known noise with several periodic sharp peaks in a frequency (e.g., sinusoids of precisely known noise power at several frequencies).

In one embodiment, temperature sensing module 111 can constitute and/or include one or more of the ML and/or AI models described herein (e.g., a classifier) that can identify such a correlation or absence of correlation between the sensed temperature and potential causes of the sensed temperature at the surface of the user 10. In one embodiment, wearable device 100 can train such ML and/or AI model(s) as described herein using the above-described annotated physiological dataset. In one embodiment, wearable device 100 can implement (e.g., execute, run) such ML and/or AI model(s) to identify such a correlation or absence of correlation between the between the sensed temperature and potential causes of the sensed temperature at the surface of the user 10 (e.g., hypothermia, hyperthermia, fever, exertion, weather, etc.).

In some embodiments, based at least in part on (e.g., in response to) sensing a surface temperature, wearable device 100 can perform one or more operations described herein to facilitate alteration (e.g., improvement) of user's 10 health, wellness, and/or well-being (e.g., physical, mental, emotional, behavioral, and/or sleep quality). For example, in at least one embodiment, wearable device 100 can perform operation(s) that can include, but not limited to: presenting the sensed temperature to user 10 and/or another computing device; providing user 10 and/or another computing device with an explanation of the sensed temperature, which can include a defined activity as described herein, suggesting one or more health improvement recommendations and/or engage another computing device to make such recommendation(s) based at least in part on (e.g., using) the sensed temperature (e.g., recommendation that user 10 seek medical attention, or seek epidemiological testing); implementing one or more wellness promoting features and/or engage another computing device to implement such feature(s) based at least in part on (e.g., using) the correlation or absence of correlation (e.g., vibrating in a particular manner to indicate to a user that they should reduce physical exertion, etc.); and/or another operation according to one or more example embodiments of the present disclosure.

In certain embodiments, physiological metric module 141 and/or physiological metric calculation module 144 can be communicatively coupled with one or more internal physiological sensors 143 that can be embedded and/or integrated in wearable device 100. In certain embodiments, physiological metric module 141 and/or physiological metric calculation module 144 can be optionally in communication with one or more external physiological sensors 145 not embedded and/or integrated in wearable device 100 (e.g., an electrode or sensor integrated in another electronic device). In some embodiments, examples of internal physiological sensors 143 and/or external physiological sensors 145 can constitute and/or include, but are not limited to, one or more sensors that can measure (e.g., capture, collect, receive) physiological data of user 10 such as, for instance, heart rate, blood oxygen level, movement, respiration, perspiration, stress data, and/or other physiological data of user 10. In some implementations, the resistor(s) 155, the temperature sensing module 111, and/or the known signal generation module 113 can be an external physiological sensor(s) 145.

In the example embodiment depicted in FIG. 4, wearable device 100 can include one or more data storage components 151 (denoted as "data storage 151" in FIG. 4). Data storage component(s) 151 according to example embodiments can constitute and/or include any suitable or desirable type of data storage such as, for instance, solid-state memory, which can be volatile or non-volatile. In some embodiments, such solid-state memory of wearable device 100 can constitute and/or include any of a wide variety of technologies such as, for instance, flash integrated circuits, phase change (PC) memory, phase change (PC) random-access memory (RAM), programmable metallization cell RAM (PMC-RAM or PMCm), ovonic unified memory (OUM), resistance RAM (RRAM), NAND memory, NOR memory, EEPROM, ferroelectric memory (FeRAM), MRAM, or other discrete NVM (non-volatile solid-state memory) chips. In some embodiments, data storage component(s) 151 can be used to store system data, such as operating system data and/or system configurations or parameters. In some embodiments, wearable device 100 can include data storage utilized as a buffer and/or cache memory for operational use by control circuitry 110.

Data storage component(s) 151 according to example embodiments can include various sub-modules that can be implemented to facilitate the physiological monitoring and the health, wellness, and/or well-being assessment principles and features disclosed herein (e.g., temperature sensing) in accordance with one or more embodiments. For example, in at least one embodiment, data storage 151 can include one or more sub-modules that can include, but not limited to: an information collection module (e.g., physiological metric module 141, physiological metric calculation module 144) that can manage the collection of physiological and/or environmental data relevant to any health, wellness, and/or well-being assessment described herein (e.g., body temperature sensing); a heart rate determination module that can determine values and/or patterns of one or more types of heart rates of user 10; a condition determination module that can determine a condition that may cause the temperature at the surface of the user 10 (e.g., the user's skin), such as a disease, hyperthermia, hypothermia, exercise, etc.); a presentation module that can manage presentation of information to user 10 that can be associated with any health, wellness, and/or well-being assessment described herein (e.g., body temperature); a feedback management module for collecting and interpreting any input data and/or feedback received from user 10 (e.g., information associated with user's 10 body temperature); and/or another sub-module.

Wearable device 100 according to example embodiments can further include a power storage module 153 (denoted as "power storage 153"), which can constitute and/or include a rechargeable battery, one or more capacitors, or other charge-holding device(s). In some embodiments, the power stored by power storage module 153 can be utilized by control circuitry 110 for operation of wearable device 100, such as for powering display 102. In some embodiments, power storage module 153 can receive power over a host interface of wearable device 100 (e.g., via one or more host interface circuitry and/or components 176 (denoted as "host interface 176" in FIG. 4)) and/or through other means.

Wearable device 100 according to example embodiments can further include one or more environmental sensors 155. In at least one embodiment, examples of such environmental sensors 155 can include, but are not limited to, sensors that can determine and/or measure, for instance, ambient light, external (non-body) temperature, altitude, device location (e.g., global-positioning system (GPS)), and/or another environmental data.

Wearable device 100 according to example embodiments can further include one or more connectivity components 170, which can include, for example, a wireless transceiver 172. Wireless transceiver 172 according to example embodiments can be communicatively coupled to one or more antenna devices 195, which can be configured to wirelessly transmit and/or receive data and/or power signals to and/or from wearable device 100 using, but not limited to, peer-to-peer, WLAN, and/or cellular communications. For example, wireless transceiver 172 can be utilized to communicate data and/or power between wearable device 100 and an external computing device (not illustrated in FIG. 4) such as, for instance, an external client computing device (e.g., a smartphone, tablet, computer) and/or an external host system (e.g., a server), which can be configured to interface with wearable device 100. In certain embodiments, wearable device 100 can include one or more host interface circuitry and/or components 176 (denoted as "host interface 176" in FIG. 4) such as, for instance, wired interface components that can communicatively couple wearable device 100 with the above-described external computing device (e.g., a smartphone, table, computer, server) to receive data and/or power therefrom and/or transmit data thereto.

Connectivity component(s) 170 according to example embodiments can further include one or more user interface components 174 (denoted as "user interface 174" in FIG. 4) that can be used by wearable device 100 to receive input data from user 10 and/or provide output data to user 10. In some embodiments, user interface component(s) 174 can be coupled to (e.g., operatively, communicatively) and/or otherwise be associated with audio and/or visual feedback component(s) 130. For instance, in these embodiments, display 102 of wearable device 100 can constitute and/or include a touchscreen display that can be configured to provide (e.g., render) output data to user 10 and/or to use audio and/or visual feedback component(s) 130 to receive user input through user contact with the touchscreen display. In some embodiments, user interface component(s) 174 can further constitute and/or include one or more buttons or other input components or features.

Connectivity component(s) 170 according to example embodiments can further include host interface circuitry and/or component(s) 176, which can be, for example, an interface that can be used by wearable device 100 to communicate with the above-described external computing device (e.g., a smartphone, table, computer, server) over a wired or wireless connection. Host interface circuitry and/or component(s) 176 according to example embodiments can utilize and/or otherwise be associated with any suitable or desirable communication protocol and/or physical connector such as, for instance, universal serial bus (USB), micro-USB, Wi-Fi, Bluetooth, FireWire, PCIe, or the like. For wireless connections, host interface circuitry and/or component(s) 176 according to example embodiments can be incorporated with wireless transceiver 172.

Although certain functional modules and components are illustrated and described herein, it should be understood that authentication management functionality in accordance with the present disclosure can be implemented using a number of different approaches. For example, in some embodiments, control circuitry 110 can constitute and/or include one or more processors (e.g., processor(s) 181) that can be controlled by computer-executable instructions that can be stored in a memory (e.g., memory 183, data storage component(s) 151) so as to provide functionality such as is described herein. In other embodiments, such functionality can be provided in the form of one or more specially designed electrical circuits. In some embodiments, such functionality can be provided by one or more processors (e.g., processor(s) 181) that can be controlled by computer-executable instructions that can be stored in a memory (e.g., memory 183, data storage component(s) 151) that can be coupled to (e.g., communicatively, operatively, electrically) one or more specially designed electrical circuits. Various examples of hardware that can be used to implement the concepts outlined herein can include, but are not limited to, application specific integrated circuits (ASICs), field-programmable gate arrays (FPGAs), and general-purpose microprocessors that can be coupled with memory that stores executable instructions for controlling the general-purpose microprocessors.

Figure 5:
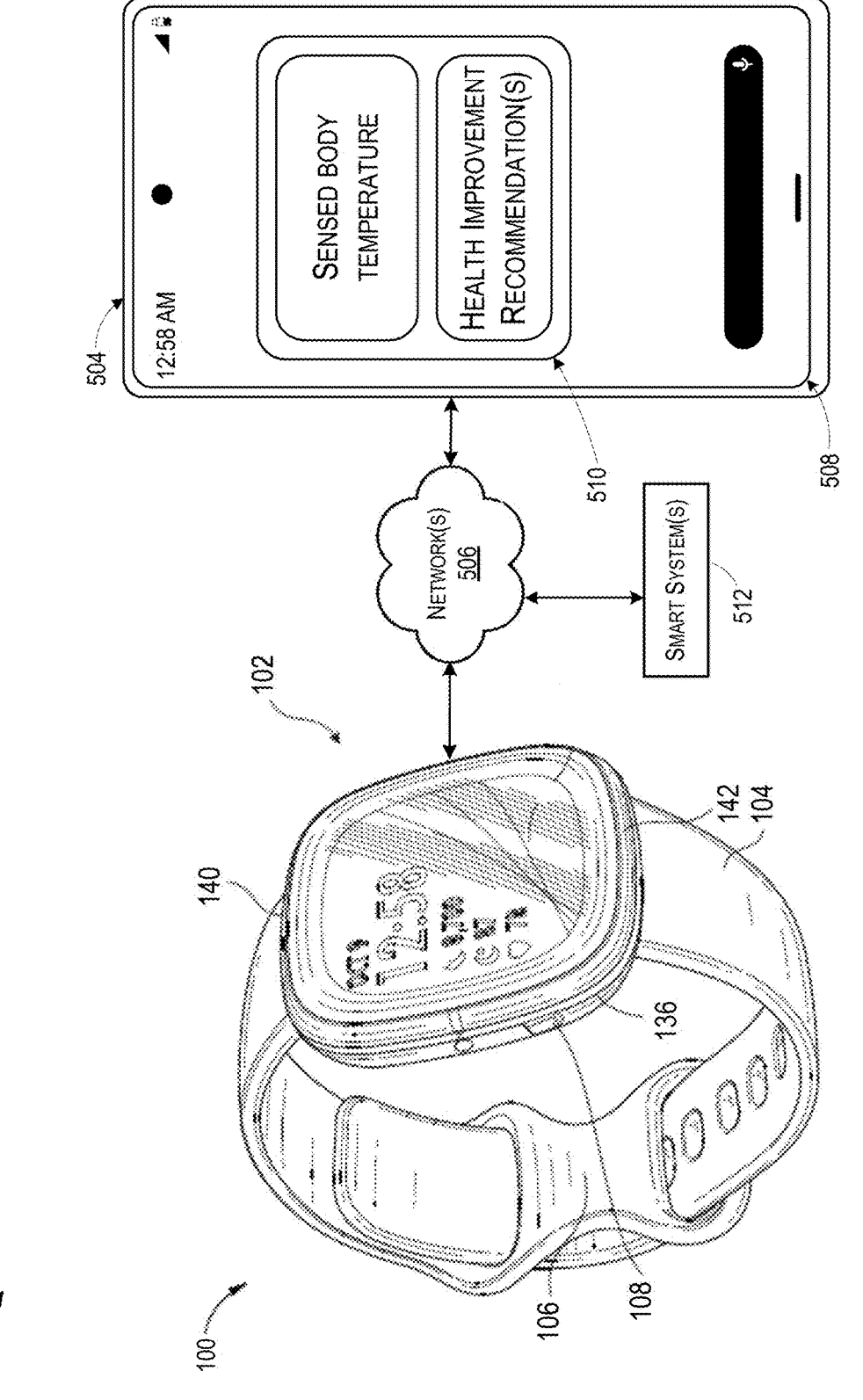
FIG. 5 illustrates a diagram of an example, non-limiting user assessment management system according to one or more example embodiments of the present disclosure.

FIG. 5 illustrates a diagram of an example, non-limiting user assessment management system 500 according to one or more example embodiments of the present disclosure.

User assessment management system 500 depicted in FIG. 5 illustrates an example, non-limiting networked relationship between wearable device 100, an external computing device 504, and/or one or more smart systems 512 in accordance with one or more embodiments.

With reference to the example embodiment described above and depicted in FIG. 4, wearable device 100 according to example embodiments of the present disclosure can perform one or more health, wellness, and/or well-being assessments (e.g., physical, mental, emotional, behavioral, and/or sleep quality assessment(s)) of user 10 and/or perform operation(s) to facilitate alteration (e.g., improvement) of user's 10 health, wellness, and/or well-being based on such assessment(s). As such, in certain embodiments described in the present disclosure, wearable device 100 can be capable of and/or configured to collect physiological sensor readings of user 10 and/or perform such assessment(s) and/or operation(s) using such readings.

However, in additional and/or alternative embodiments, wearable device 100 and/or another electronic and/or computing device that can be used to detect physiological information of user 10, can be in communication with external computing device 504. In these and/or other embodiments, external computing device 504 can be configured to use such physiological information of user 10 to perform such one or more health, wellness, and/or well-being assessments (e.g., body temperature sensing) of user 10 according to one or more embodiments described herein. In these and/or other embodiments, based at least in part on (e.g., in response to) performing such assessment(s), external computing device 504 can perform one or more operations described herein to facilitate alteration (e.g., improvement) of user's 10 health, wellness, and/or well-being (e.g., physical, mental, emotional, behavioral, and/or sleep quality).

Wearable device 100 according to example embodiments can be configured to collect one or more types of physiological and/or environmental data using embedded sensors and/or external devices, as described throughout the present disclosure, and communicate or relay such information over one or more networks 506 to other devices. This includes, in some embodiments, relaying information to devices capable of serving as Internet-accessible data sources, thus permitting the collected data to be viewed, for example, using a web browser or network-based application at, for instance, external computing device 504. For example, while user 10 is wearing wearable device 100, wearable device 100 can capture, calculate, and/or store environment data and/or user's 10 physiological data (e.g., heart rate, motion data, temperature, respiration, perspiration, EDA, stress data) using one or more environmental and/or physiological sensors. Wearable device 100 according to example embodiments can then transmit data representative of such environment data and/or user's 10 physiological data over network(s) 506 to an account on a web service, computer, mobile phone, and/or health station where the data can be stored, processed, and visualized by user 10 and/or another entity (e.g., a health care professional).

While wearable device 100 is shown in example embodiments of the present disclosure to have a display, it should be understood that, in some embodiments, wearable device 100 does not have any type of display unit. In some embodiments, wearable device 100 can have audio and/or visual feedback components such as, for instance, light-emitting diodes (LEDs), buzzers, speakers, and/or a display with limited functionality. Wearable device 100 according to example embodiments can be configured to be attached to user's 10 body or clothing. For example, in these or other embodiments, wearable device 100 can be configured as a wrist bracelet, watch, ring, electrode, finger-clip, toe-clip, chest-strap, ankle strap, and/or a device placed in a pocket. In additional or alternative embodiments, wearable device 100 can be embedded in something in contact with user 10 such as, for instance, clothing, a mat that can be positioned under user 10, a blanket, a pillow, and/or another accessory.

In one or more embodiments of the present disclosure, the communication between wearable device 100 and external computing device 504 can be facilitated by network(s) 506. In some embodiments, network(s) 506 can constitute and/or include, for instance, one or more of an ad hoc network, a peer-to-peer communication link, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, and/or any other type of network. In some embodiments, the communication between wearable device 100 and external computing device 504 can also be performed through a direct wired connection. In these or other embodiments, this direct-wired connection can be associated with any suitable or desirable communication protocol and/or physical connector such as, for instance, universal serial bus (USB), micro-USB, Wi-Fi, Bluetooth, FireWire, PCIe, or the like.

In example embodiments of the present disclosure, a variety of computing devices can be in communication with wearable device 100 to facilitate user's 10 health, wellness, and/or well-being assessment and/or alteration (e.g., improvement). Although external computing device 504 is depicted as a smartphone in the example embodiment illustrated in FIG. 5, it should be understood that the present disclosure is not so limiting. For instance, external computing device 504 according to example embodiments can constitute and/or include, for example, a smartphone with a display 508 as depicted in FIG. 5, a personal digital assistant (PDA), a mobile phone, a tablet, a personal computer, a laptop computer, a smart television, a video game console, a server, and/or another computing device that can be external to wearable device 100.

The networked relationship depicted in the example embodiment illustrated in FIG. 5 demonstrates how, in some embodiments, external computing device 504 can be implemented to perform one or more health, wellness, and/or well-being assessments (e.g., a body temperature assessment) of user 10 and/or perform operation(s) to facilitate alteration (e.g., improvement) of user's 10 health, wellness, and/or well-being based on such assessment(s). For example, in one embodiment, user 10 can wear wearable device 100 that can be equipped as a bracelet with one or more physiological sensors but without a display. In this and/or another embodiment, while user 10 is wearing wearable device 100, wearable device 100 can capture, calculate, and/or store environment data and/or user's 10 physiological data (e.g., temperature) using the physiological sensors. Wearable device 100 according to example embodiments can then transmit data representative of such environment data and/or user's 10 physiological data over network(s) 506 to an account on a web service, computer, mobile phone, and/or health station where the data can be stored, processed, and visualized by user 10 and/or another entity (e.g., a health care professional). In some embodiments, wearable device 100 can periodically or continuously transmit such information to external computing device 504 over network(s) 506.

In additional and/or alternative embodiments, wearable device 100 can store the above-described collected physiological and/or environmental data and transmit this data to external computing device 504 in response to a trigger event such as, for instance, detection of an abnormal surface temperature of the skin of the user 10 (e.g., above or below a threshold range of standard human temperatures) after a period performing the defined activity. In some embodiments, wearable device 100 can transmit such data to external computing device 504 in response to detecting that a command has been performed by external computing device 504 such as, for instance, manual or automatic execution of an instruction to synchronize collected physiological and/or environmental data and perform one or more health, wellness, and/or well-being assessments (e.g., body temperature assessment) of user 10 as described herein.

In some embodiments, external computing device 504 can present (e.g., provide, render) a possible cause of the body temperature of user 10. For instance, in these or other embodiments, external computing device 504 can generate an intelligent notification 510 that can include such body temperature and/or one or more health improvement recommendations (e.g., a suggestion to reduce physical activity, a suggestion to see a healthcare provider, etc.) that, if and/or when implemented by user 10, can facilitate alteration (e.g., improvement) of user's 10 health, wellness, and/or well-being (e.g., body temperature). In the example embodiment depicted in FIG. 5, external computing device 504 can render intelligent notification 510 having such body temperature and the health improvement recommendation(s) on display 508 such that user 10 and/or another entity (e.g., health care professional, mental health care professional, sleep therapy provider, doctor, caregiver) can view such information.

Although not illustrated in the example embodiment depicted in FIG. 5, in some embodiments, wearable device 100 can: sense a body temperature of the user 10; determine one or more health improvement recommendations based on (e.g., in response to) sensing the body temperature; generate intelligent notification 510 such that it includes the body temperature and the health improvement recommendation(s); and render this information on display 102 of wearable device 100.

In one embodiment of the present disclosure, wearable device 100 and/or external computing device 504 can implement (e.g., initiate, run, operate) one or more wellness promoting features that can be included with wearable device 100 and/or external computing device 504 such as, for instance, a wellness promoting audio feature (e.g., by playing a sound that alerts the user to the occurrence of an abnormal body temperature), and/or another wellness promoting feature of wearable device 100 and/or external computing device 504.

In another embodiment of the present disclosure, wearable device 100 and/or external computing device 504 can facilitate implementation of one or more wellness promoting features of another computing device such as, for instance, a computing device of one or more smart systems 512. In this or another embodiment, smart system(s) 512 can constitute and/or include, but are not limited to, an audio system (e.g., a home audio system), a lighting system (e.g., a home lighting system), an HVAC system (e.g., a home HVAC system), an exercise system (e.g., an exercise machine), and/or another system that can be included in, coupled to, and/or operated by a computing device other than wearable device 100 and/or external computing device 504. For instance, in some embodiments, smart system(s) 512 can constitute and/or include a smart audio system, a smart lighting system, a smart HVAC system, and/or a smart exercise system (e.g., a smart exercise machine). In these or other embodiments, wearable device 100 and/or external computing device 504 can facilitate implementation of one or more wellness promoting features of smart system(s) 512 such as, for instance: a wellness promoting audio feature of a smart audio system; a wellness promoting lighting feature of a smart lighting system; a wellness promoting ambient temperature feature of a smart HVAC system; a wellness promoting exercise feature (e.g., a certain exercise mode or setting) of a smart exercise system; and/or another wellness promoting feature of smart system(s) 512.

In some embodiments described herein, wearable device 100 and/or external computing device 504 can send instructions to smart system(s) 512 that, when executed by such system(s) (e.g., via one or more processors), can cause the system(s) to perform operations to implement one or more wellness promoting features of such system(s). In one embodiment, wearable device 100 and/or external computing device 504 can send instructions to a smart audio system that, when executed by such a system (e.g., via one or more processors), can cause it to inform the user 10 that an abnormal body temperature has been detected. In another embodiment, wearable device 100 and/or external computing device 504 can send instructions to a smart HVAC system that, when executed by such a system (e.g., via one or more processors), can cause it to output air at a certain wellness promoting temperature (e.g., a certain temperature that can be defined by user 10). In one embodiment of the present disclosure, wearable device 100 and/or external computing device 504 can send instructions to a smart exercise system that, when executed by such a system (e.g., via one or more processors), can cause it to operate in a certain mode or setting and/or to provide a recommendation to the user to select such a mode or setting.

Figure 6:
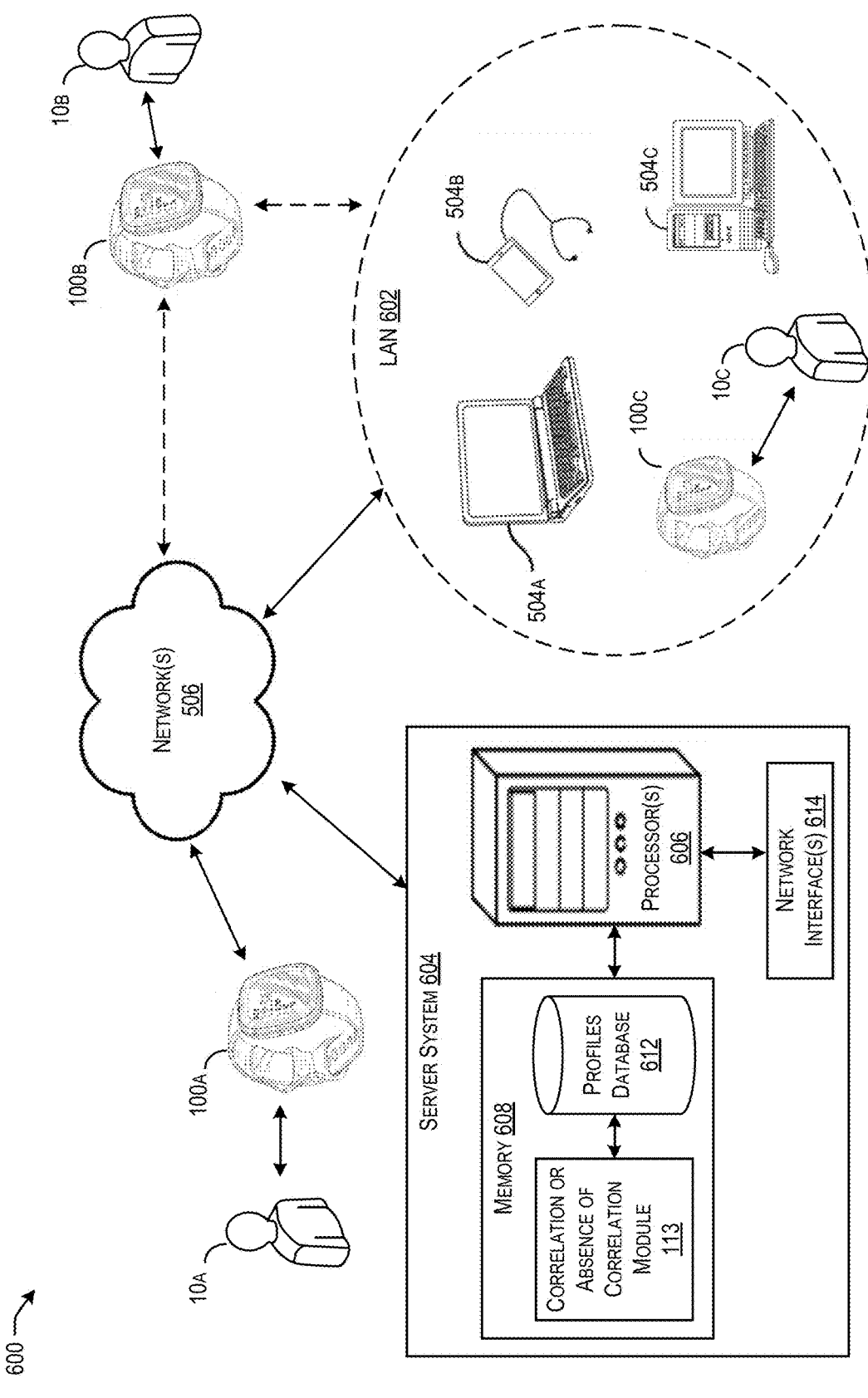
FIG. 6 illustrates a diagram of an example, non-limiting user assessment management system according to one or more example embodiments of the present disclosure.

FIG. 6 illustrates a diagram of an example, non-limiting user assessment management system 600 according to one or more example embodiments of the present disclosure. User assessment management system 600 depicted in FIG. 6 illustrates an example, non-limiting networked relationship between one or more wearable devices 100a, 100b, 100c, one or more external computing devices 504a, 504b, 504c, and/or a server system 604 in accordance with one or more embodiments.

In the example embodiment depicted in FIG. 6, wearable devices 100a, 100b, 100c can each include the same characteristics, structure, components, attributes, and/or functionality as that of wearable device 100. In this embodiment, each wearable device 100a, 100b, 100c can be coupled to (e.g., worn by) a respective user 10a, 10b, 10c. In this embodiment, external computing devices 504a (e.g., a laptop computer), 504b (e.g., a smartphone), 504c (e.g., a personal computer) can each include the same characteristics, structure, components, attributes, and/or functionality as that of external computing device 504.

In some embodiments of the present disclosure, network(s) 506 can couple (e.g., communicatively) one or more of wearable devices 100a, 100b, 100c to server system 604 and/or one or more of external computing devices 504a, 504b, 504c. In some embodiments, one or more of external computing devices 504a, 504b, 504c and/or one or more of wearable devices 100a, 100b, 100c can be interconnected in a local area network (LAN) 602 or another type of communication interconnection that can be connected to (e.g., communicatively coupled to) network(s) 506. LAN 602 according to example embodiments can interconnect one or more of external computing devices 504a, 504b, 504c, as well as one or more of wearable devices 100a, 100b, 100c. In some embodiments, one or more of wearable devices 100a, 100b, 100c and/or one or more of external computing devices 504a, 504b, 504c can be connected to (e.g., communicatively coupled to) network(s) 506 and/or server system 604, indirectly, through LAN 602. In some embodiments, one or more of wearable devices 100a, 100b, 100c can be directly connected to (e.g., communicatively coupled to) network(s) 506 and/or indirectly connected to network(s) 506 through LAN 602. For instance, in the example embodiment depicted in FIG. 6, wearable device 100b can be connected to (e.g., communicatively coupled to) external computing device 504b (e.g., a smartphone) through, for example, a Bluetooth connection. In this embodiment, external computing device 504b can be connected to (e.g., communicatively coupled to) server system 604 through network(s) 506 and wearable device 100b can also be connected to (e.g., communicatively coupled to) server system 604 through network 506.

In the example embodiment depicted in FIG. 6, server system 604 can collect detected physiological and/or environmental sensor readings from one or more of wearable devices 100a, 100b, 100c. In some embodiments, server system 604 can also collect from one or more of wearable devices 100a, 100b, 100c and/or from one or more of external computing devices 504a, 504b, 504c, body temperatures of one or more users 10a, 10b, 10c, etc.

For example, in the embodiment depicted in FIG. 6, wearable device 100a is not associated with an external computing device, therefore wearable device 100a can transmit physiological data of user 10a (e.g., a body temperature) to server system 604. In this embodiment, server system 604 can analyze the received data to identify a correlation or absence of correlation between a body temperature of user 10a and at least one activity performed by user 10a at a certain. In this embodiment, server system 604 can transmit an intelligent notification (e.g., intelligent notification 510), the body temperature of user 10a, and/or one or more health improvement recommendations back to wearable device 100a.

As another example, in the embodiment depicted in FIG. 6, wearable device 100b can transmit physiological data of user 10b to server system 604 and external computing device 504a. In this embodiment, external computing device 504a can analyze the received data to identify a body temperature of user 10b and at least one health condition associated with user 10b. In this embodiment, server system 604 can use the received physiological data (e.g., body temperature) of user 10b to update a user profile for user 10b that can be stored in a profiles database 612 (e.g., a log) that can be stored on a memory 608 that can be included in, coupled to, and/or otherwise associated with server system 604.

In some embodiments, server system 604 can be implemented on one or more standalone data processing apparatuses or a distributed network of computers. In some embodiments, server system 604 can employ various virtual devices and/or services of third-party service providers (e.g., third-party cloud service providers) to provide the underlying computing resources and/or infrastructure resources of server system 604. In some embodiments, server system 604 can include, but is not limited to, a handheld computer, a tablet computer, a laptop computer, a desktop computer, or a combination of any two or more of these data processing devices or other data processing devices.

Server system 604 according to example embodiments can include one or more processors 606 (e.g., processing unit(s), denoted as "processor(s) 606" in FIG. 6) such as, for instance, one or more CPUs. In these or other embodiments, server system 604 can include one or more network interfaces 614 that can include, for example, an input/output (I/O) interface to external computing device 504*a*, 504*b*, and/or 504*c* and/or wearable devices 100*a*, 100*b*, and/or 100*c*. In some embodiments, server system 604 can include memory 608, and one or more communication buses for interconnecting these components.

Memory 608 according to example embodiments can include high-speed random-access memory such as, for instance, DRAM, SRAM, DDR RAM, or other random-access solid-state memory devices; and, optionally, can include non-volatile memory such as, for example, one or more magnetic disk storage devices, one or more optical disk storage devices, one or more flash memory devices, or one or more other non-volatile solid state storage devices. Memory 608 according to example embodiments, optionally, can include one or more storage devices that can be remotely located from processor(s) 606 (e.g., processing unit(s)). Memory 608 according to example embodiments, or alternatively the non-volatile memory within memory 608, can include a non-transitory computer readable storage medium. In some embodiments, memory 608, or the non-transitory computer readable storage medium of memory 608, can store one or more programs, modules, and data structures. In these embodiments, such programs, modules, and data structures can include, but not be limited to, one or more of an operating system that can include procedures for handling various basic system services and for performing hardware dependent tasks, a network communication module for connecting server system 604 to other computing devices (e.g., wearable device 100*a*, 100*b*, and/or 100*c* and/or external computing device 504*a*, 504*b*, and/or504*c*) connected to network(s) 506 via network interface(s) 614 (e.g., wired or wireless).

Memory 608 according to example embodiments can also include profiles database 612 that can store user profiles for users 10*a*, 10*b*, 10*c*. In some embodiments, a respective user profile for a user can include, for instance: a user identifier (e.g., an account name or handle); login credentials (e.g., login credentials to user assessment management system 600); email address or preferred contact information; wearable device information (e.g., model number); demographic parameters for the user (e.g., age, gender, occupation); historical physiological data of the user; historical correlations or absences of correlation between trigger events and moods experienced by the user; and/or identified health, wellness, and/or well-being metrics and/or trends of the user (e.g., body temperature of the user).

In some embodiments, a user can opt in or opt out of providing health, wellness, and/or well-being assessment information (e.g., physical, mental, emotional, behavioral, and/or sleep quality assessment information) to a population-normalization determination for other users. In some embodiments, a user's health, wellness, and/or well-being assessment information (e.g., body temperature) can be incorporated into population-normalized health, wellness, and/or well-being metric and/or trend information (e.g., physical, mental, emotional, behavioral, and/or sleep quality metric and/or trend information) used to determine that user's own values for one or more health, wellness, and/or well-being metrics and/or trends (e.g., physical, mental, emotional, behavioral, and/or sleep quality metrics and/or trends).

In at least one embodiment described herein, server system 604 can record, in profiles database 612, the health, wellness, and/or well-being assessment information (e.g., body temperature information) respectively corresponding to users 10*a*, 10*b*, 10*c*. In example embodiments of the present disclosure, with respect to each of such users 10*a*, 10*b*, 10*c*, such health, wellness, and/or well-being assessment information can include a plurality of body temperatures. In some embodiments, with respect to each of such users 10*a*, 10*b*, 10*c*, such health, wellness, and/or well-being assessment information can include the above-described annotated physiological dataset that can be used to train an ML and/or AI model described herein to identify such a plurality of correlations and plurality of absences of correlation.

Figure 7:
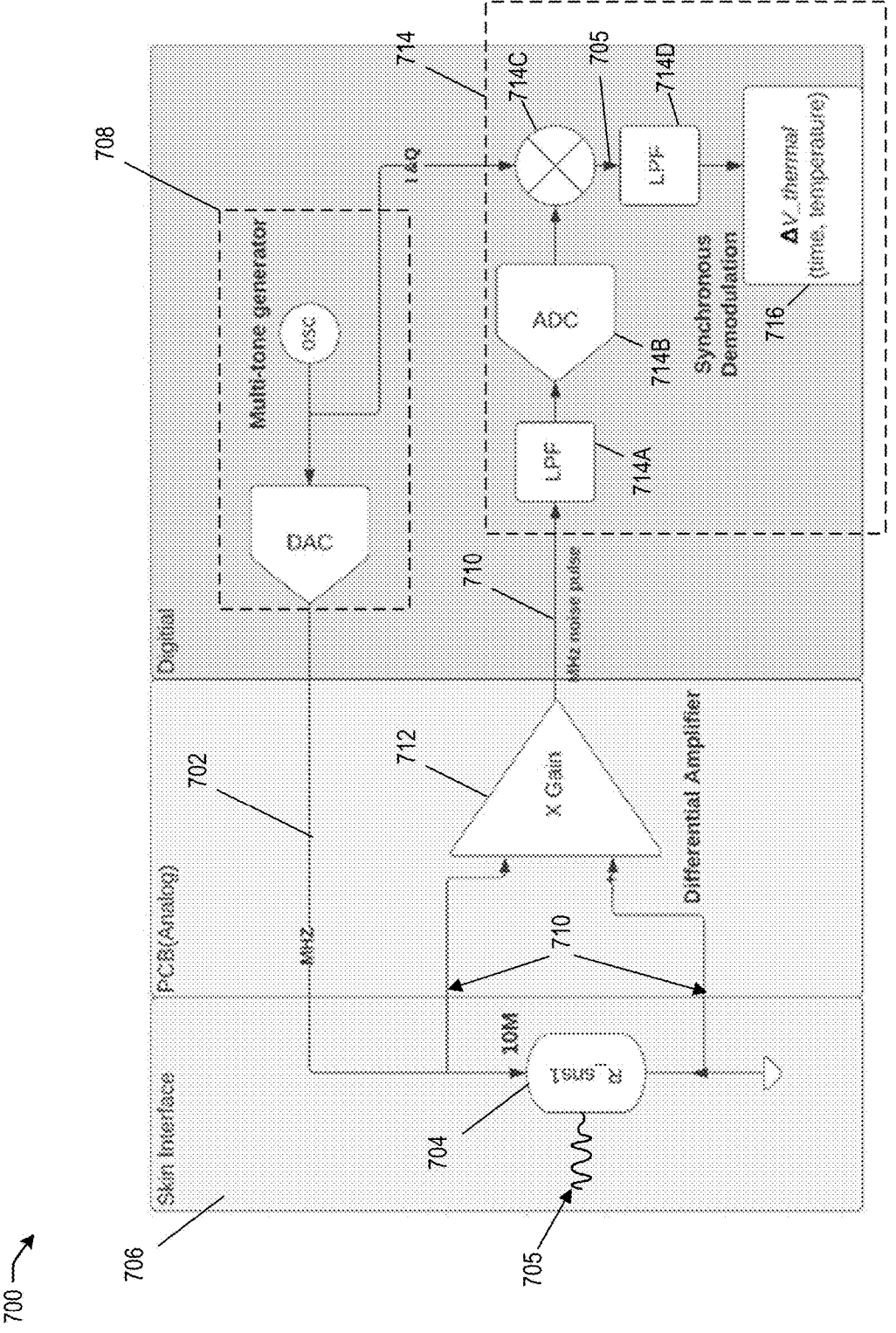
FIG. 7 is a data flow diagram for sensing a temperature of a surface according to some embodiments of the present disclosure.

FIG. 7 is a data flow diagram 700 for sensing a temperature of a surface according to some embodiments of the present disclosure. More particularly, a known signal 702 can be sent to a resistor 704. The resistor 704 can directly contact surface 706 (e.g., the skin of a user, etc.). For example, the known signal generation module 708 (e.g., the known signal generation module 113 of FIG. 4, etc.) can include a digital-to-analog converter that is programmed to generate a known power of thermal noise (e.g., known signal 702). The known signal 702 can travel through the resistor 704. However, because the resistor 704 is contacting with the surface 706, the temperature of the surface 706 (e.g., 98.6 F/37 C) can cause thermal noise 705 at the resistor 704.

The resistor 704 can provide a signal 710. The signal 710 from the resistor 704 can include the known signal 702 and thermal noise 705. In some implementations, the signal 710 can be amplified by an amplifier 712 (e.g., a differential amplifier, etc.). Temperature determination module 714 can extract the thermal noise 705 from the signal 710 from the resistor 704. Based on the thermal noise 705, a temperature 716 of the surface 706 can be determined.

For example, the temperature determination module 714 can include a low pass filter 714A. The signal 710 can pass through the low pass filter to an audio-to-digital converter 714B of the temperature determination module 714, which can convert the signal 710 to a digital signal. The thermal noise 705 can be extracted from the signal 710 with an extractor 714C and a second low-pass filter 714D of the temperature determination module 714.

It should be noted that, in some implementations, the operations performed in diagram 700 may be performed by a particular physical or virtualized computing device. For example, each of the components described herein may be included in the temperature sensing module 111 of FIG. 4. Alternatively, in some implementations, some components herein may be separate from, but communicatively coupled to, other components described herein. For example, the resistor 704 can be separate from, but communicatively coupled to, the known signal generation module 708 and/or the temperature determination module 714.

Figure 8:
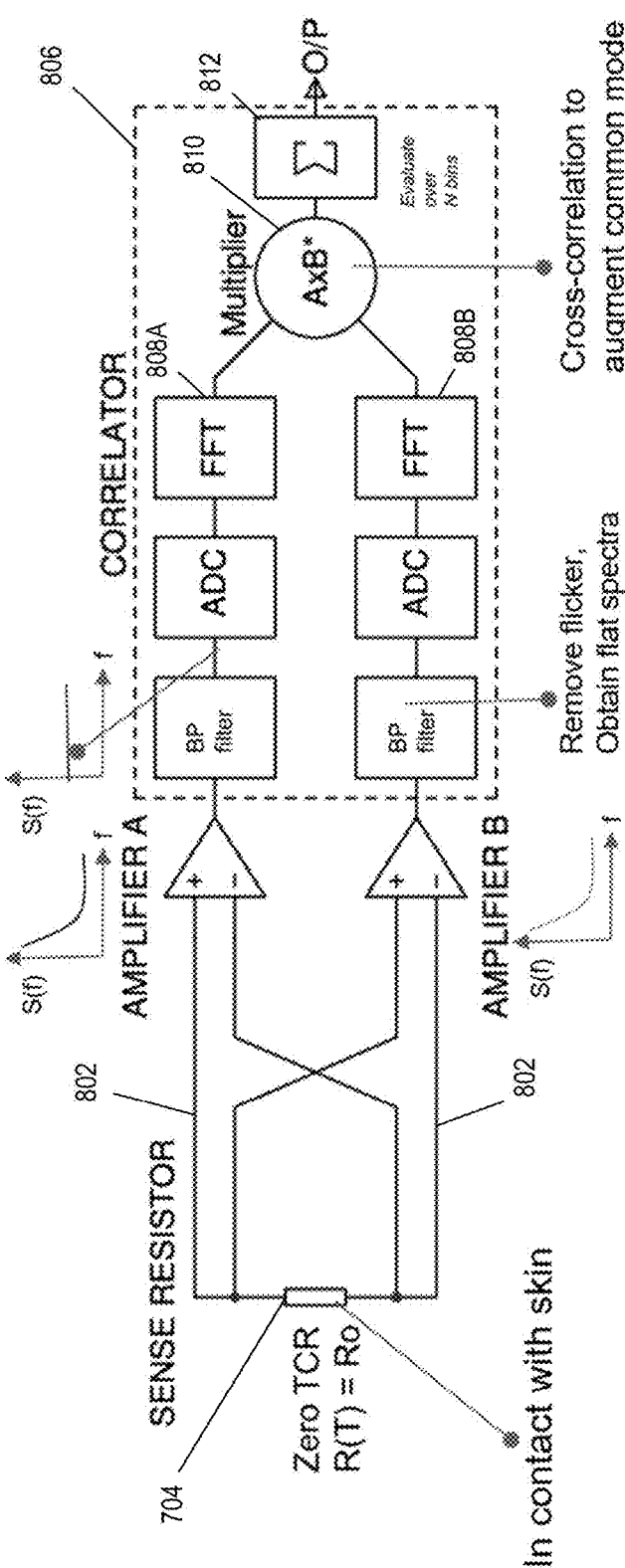
FIG. 8 is a data flow diagram for sensing a temperature of a surface according to some other embodiments of the present disclosure.

FIG. 8 is a data flow diagram 800 for sensing a temperature of a surface according to some other embodiments of the present disclosure. More specifically, diagram 800 includes the resistor 704 of FIG. 7. However, unlike FIG. 7, the resistor 704 provides a signal 802 that does not include a known signal (e.g., known signal 702 of FIG. 7). In other words, the signal 802 can be received from the resistor without transmission of a known signal, and the signal 802 can include the thermal noise of the resistor 704. To extract the thermal noise without transmission of a known signal, the signal 802 can be provided to two amplifiers 804A and 804B as signals 802A and 802B Amplifiers 804A and 804B can amplify the signals 802A and 802B and send the signals 802A and 802B through one or more components (e.g., a band pass filter, an audio-to-digital converter, etc.) of temperature determinator 806.

Temperature determinator 806 can determine Fast Fourier Transforms (FFTs) 808A and 808B for signals 802A and 802B. The temperature determinator 806 can then perform cross-correlation of the FFTs 808A and 808B at a multiplier 810 to extract the thermal noise. The thermal noise can be evaluated across a number of bins 812 to determine the temperature.

Figure 9:
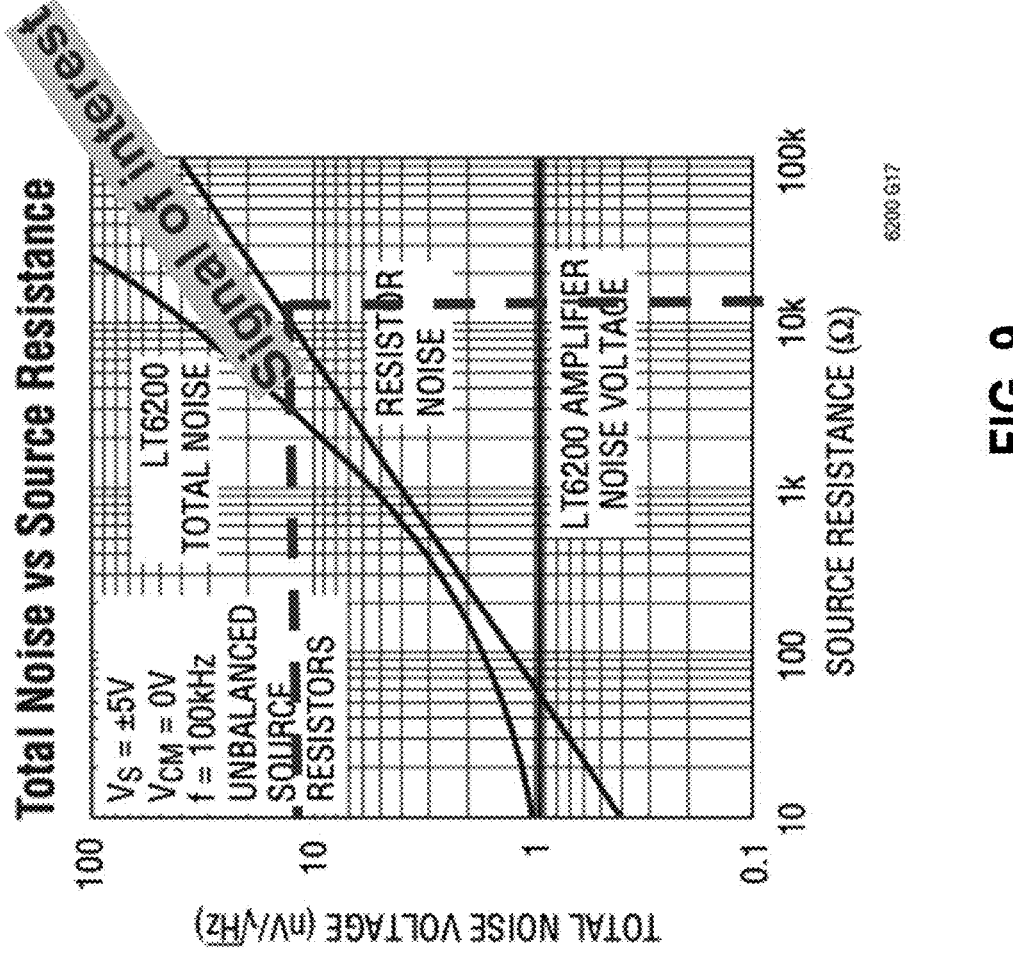
FIG. 9 illustrates example signal data for thermal noise isolated from other noise sources at a resistor according to some implementations of the present disclosure.

FIG. 9 illustrates example signal data 900 for thermal noise isolated from other noise sources at a resistor according to some implementations of the present disclosure. More specifically, as depicted, the signal of interest can depict the thermal noise. The thermal noise can be isolated from other noise sources, such as amplifier noise voltage and resistor noise.

Figure 10:
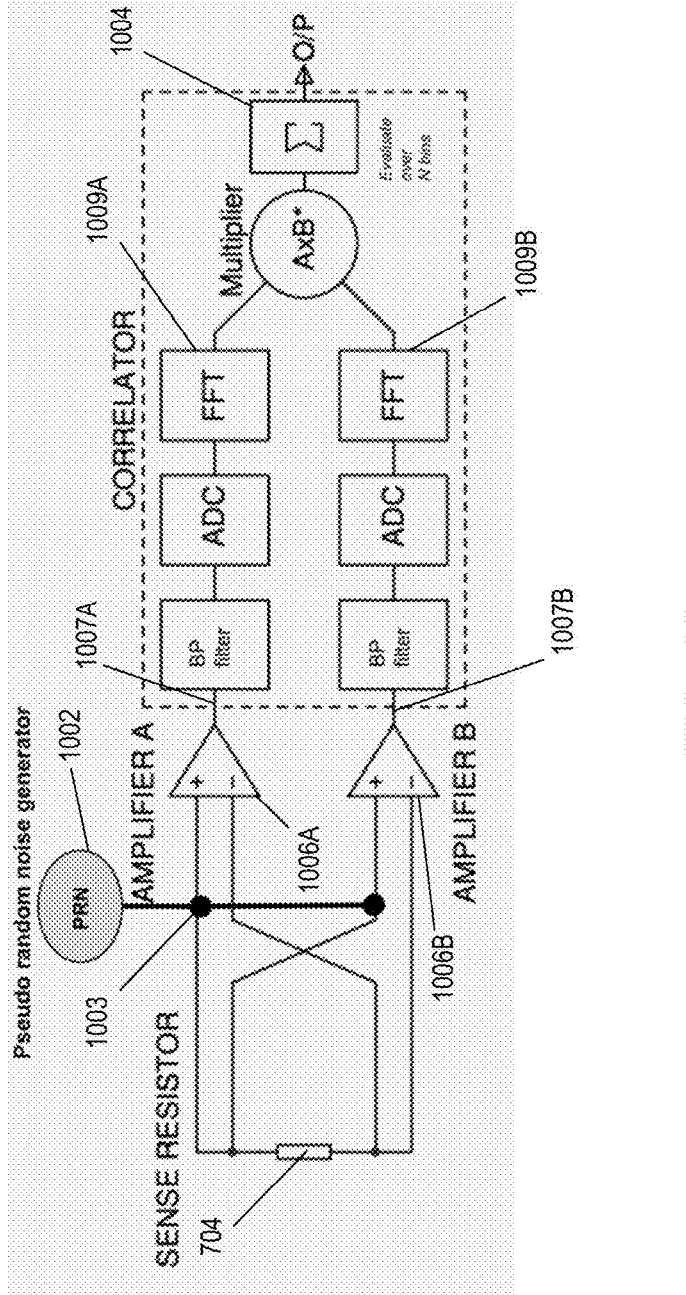
FIG. 10 is a data flow diagram for sensing a temperature of a surface according to some other embodiments of the present disclosure.

FIG. 10 is a data flow diagram 1000 for sensing a temperature of a surface according to some other embodiments of the present disclosure. More specifically, diagram 1000 includes resistor 704 of FIGS. 7 and 8. However, unlike FIG. 8, a known signal is sent to the resistor 704 by a pseudo-random noise generator 1002 (e.g., known signal generation module 708). A signal provided by the resistor 704 can include the known signal 1003 from the pseudo-random noise generator 1002 and the thermal noise. The thermal noise can be extracted as described with regards to FIG. 8, and can be evaluated across a series of bins 1004 to determine the temperature.

For example, amplifiers 1006A and 1006B can faithfully buffer the signals for further signal processing. Two signal paths with the same resistor noise (Common mode signal) is generated with amplifiers 1006A and 1006B. However, the amplifiers add uncorrelated noise to each of the signal paths that are undesirable and masks the signal of interest (sense resistor noise). This uncorrelated noise can be removed subsequently.

The pseudo random noise generator 1002 can be implemented on chip via a digital to analog convertor programmed to generate a known power of Johnson noise spectrum (i.e., thermal noise spectrum). The Johnson noise of the resistor 704 is the one that is subject to fluctuate, and the known signal 1003 can be a known reference on chip. The known signal 1003 can be a known noise with several periodic sharp spikes/peaks in frequency—sinusoids of precisely known noise power at several frequencies are injected to the paths of both amplifiers 1006A and 1006B as depicted. The known signal 1003 can be used in signal processing to determine sense resistor (R) and also Temperature (T). The sense resistor can change based on the type of mobile computing device utilized, device to device and also due to environmental factors.

As described with regards to FIG. 8, signals 1007A and 1007B from amplifiers 1006A and 1006B can be band pass filtered to have a spectrum with just white noise components with nearly flat band noise in the spectra for further processing. This can remove undesirable flicker noise from the spectrum so that only white noise spectra is passed for further processing.

The signals 1007A and 1007B can be sent to analog to digital convertors (ADC) to digitize for signal processing as described with regards to FIG. 8. This can also add uncorrelated noise in each signal path. At this stage, the signal paths of signals 1007A and 1007B have the desired common mode noise of sense resistor and the uncorrelated noise of amplifiers and ADCs in each path.

The FFTs of each of the paths of signals 1007A and 1007B are calculated. Then the FFT 1009A of the path of signal 1007A is multiplied with complex conjugate of FFT 1009B of the path of signal 1007B to get a cross-correlation spectrum. This spectrum augments just the common mode noise of the resistor 704 and significantly attenuates the uncorrelated noises of ADCs and amplifiers. Hence isolating the noise power of interest—the sense resistor. The cross-correlation spectrum can be evaluated across bins 1004.

Figure 11:
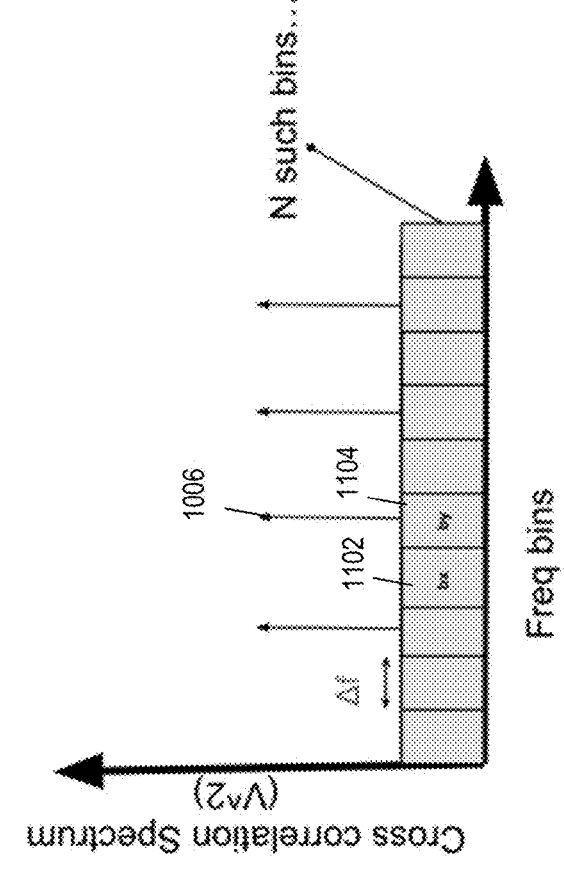
FIG. 11 is a block diagram illustrating an example of binning for evaluating thermal noise across a series of bins that correspond to the known signal generated at pseudo-random noise generator according to some implementations of the present disclosure.

However, unlike the bins 812 of FIG. 8, bins 1004 can be evaluated in accordance with the known signal 1003 generated with the pseudo-random noise generator 1002. For example, turning to FIG. 11, FIG. 11 is a block diagram illustrating an example of binning for evaluating thermal noise across a series of bins that correspond to the known signal 1003 generated at pseudo-random noise generator 1002 according to some implementations of the present disclosure. More specifically, bins 1102 (e.g., bins b(x)) only include the noise power of the sense resistor (e.g., the thermal noise, etc.). The bins 1104 (e.g., bins b(y)) can include the noise power of both the sense resistor (e.g., thermal noise) and peaks (e.g., sinusoids) 1106 of the known signal 1003 generated by the pseudo-random noise generator 1002 of FIG. 10 (e.g., sinusoids that we injected which manifests as sharp spikes at certain frequencies in the cross-correlation spectra). More specifically, Accordingly, with two equations, and two unknowns (e.g., sense resistance R and Temperature), the temperature can be determined across several bins 1102/1104. In other words, to reduce uncertainty, the temperature can be determined by averaging over N bins using the equations below:

$$b(x) = 4k_B TR\Delta f \qquad \text{Equation 1}$$

$$b(y) = v_{PRN}^2 + 4k_B TR\Delta f = v_{PRN}^2 + b(x) \qquad \text{Equation 2}$$

$$v_{PRN}^2 = \left(\frac{i_{PRN} * R_{sense}}{\sqrt{(2)}}\right)^2$$

where b(x) are bins 1102, b(y) are bins 1104. The root mean square (RMS) of voltage $v_n$ is given $$\text{by } \sqrt{v_n^2}\, \sqrt{\Delta f} = \sqrt{4k_B TR\Delta f},$$

where $k_B$ is Boltzman's constant, R is the temperature sense resistor, T is the temperature of the surface to be determined, and $\Delta f$ is the measurement bandwidth. Ohm's law at low frequency tones can be utilized to calculate R, $$R = \frac{b(y)}{i_{PRN}^2},$$

which provides:

$$\frac{b(y)}{b(x)} = 1 + \frac{V_{PRN}^2}{\sqrt{4k_B\Delta f TR}} = > 4k_B\Delta f TR = \frac{V_{PRN}^2}{\left(\frac{b(y)}{b(x)} - 1\right)}$$

-continued $$T = \frac{V_{PRN}^2}{\left(\frac{b(y)}{b(x)} - 1\right) * (4k_B \Delta f R)} = \frac{\left(\frac{i_{PRN} * R_{sense}}{\sqrt{(2)}}\right)^2}{\left(\frac{b(y)}{b(x} - 1\right) * (4k_B \Delta f R)}$$

In such fashion, changes in Johnson noise of the resistor (e.g., resistor 704) that is in contact with the skin can be continuously monitored. Johnson noise changes only due to skin temperature changes. Additionally, other metal surfaces or resistors that are not in contact with skin but are facing/in contact with ambient temperature and/or the device to measure and compensate for the undesired temperature changes and just measure skin temperature changes.

Example Methods

FIG. 12 depicts a flow chart diagram of an example method to perform according to example embodiments of the present disclosure. Although FIG. 12 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

At 1202, a computing system (e.g., mobile computing device, a wearable computing device, etc.) sends a known signal to a resistor of the computing system. The resistor directly contacts a surface. For example, the resistor can be contacting a wrist or other portion of exposed skin of a user.

In some implementations, the mobile computing device can be a wearable computing device, and sending the known signal to the resistor can include sending a known signal to a resistor of the wearable computing device. The resistor of the wearable computing device can directly contact a portion of skin of a user of the wearable computing device.

In some implementations, sending the known signal to the resistor of the mobile computing device can include sending the known signal to an amplifier. Receiving the signal from the resistor can include receiving the signal from the resistor at the amplifier. The signal can include the known signal and the degree of thermal noise from the resistor, and the degree of thermal noise can be associated with the temperature of the surface.

In some implementations, sending the known signal to an amplifier can include sending the known signal to a first amplifier and a second amplifier. In some implementations, receiving the signal from the resistor at the amplifier can include receiving the signal from the resistor at the first amplifier and the second amplifier. Extracting the thermal noise from the signal can include respectively determining a first FFT and a second FFT for the signal from the resistor at the first amplifier and the signal from the resistor at the second amplifier. A cross-correlation spectrum can be determined based on the first FFT and the second FFT. The cross-correlation spectrum can include the thermal noise.

In some implementations, prior to sending the known signal to the resistor of the mobile computing device, the computing system can generate the known signal using a pseudo-random noise generator. The known signal can include pseudo-random noise. The pseudo-random noise is a known noise with a frequency comprising a plurality of peaks. In some implementations, the pseudo-random noise generator can include an analog-to-digital converter (ADC) programmed to generate a known power of thermal noise spectrum.

At 1204, the computing system receives a signal from the resistor. The signal can include the known signal and a degree of thermal noise from the resistor. The degree of thermal noise can be associated with a temperature of the surface.

At 1206, the computing system extracts the thermal noise from the signal from the resistor. In some implementations, extracting the thermal noise from the signal from the resistor can include performing a synchronous demodulation process to a signal received from the amplifier to extract the thermal noise. In some implementations, the known signal can include a first amplitude, and the signal received from the amplifier can include a second amplitude different than the first amplitude.

At 1208, the computing system determines the temperature of the surface based on the thermal noise extracted from the signal from the resistor. In some implementations, determining the temperature of the surface based on the thermal noise extracted from the known signal can include binning the thermal noise across a plurality of bins including a first set of bins and a second set of bins. The first set of bins can respectively correspond to the plurality of peaks. One or more bins of the second set of bins can be adjacent to each bin of the first set of bins.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method, comprising:

sending, by a mobile computing device comprising one or more processor devices, a known signal to a resistor of the mobile computing device, wherein the resistor is configured to directly contact a surface;

receiving, by the mobile computing device, a signal from the resistor, wherein the signal from the resistor comprises the known signal and a degree of thermal noise from the resistor, and wherein the degree of thermal noise is associated with a temperature of the surface;

extracting, by the mobile computing device, the thermal noise from the signal from the resistor; and determining, by the mobile computing device, the temperature of the surface based on the thermal noise extracted from the signal from the resistor;

wherein determining the temperature of the surface based on the thermal noise extracted from the signal from the resistor comprises binning, by the mobile computing device, the signal from the resistor across a plurality of bins comprising a first set of bins and a second set of bins, wherein the first set of bins respectively correspond to a plurality of peaks of the known signal.

2. The method of claim 1, wherein the mobile computing device comprises a wearable computing device, and wherein the resistor is configured to directly contact a portion of skin of a user of the wearable computing device.

3. The method of claim 1, wherein sending the known signal to the resistor of the mobile computing device further comprises sending the known signal to an amplifier; and wherein receiving the signal from the resistor comprises receiving, by the mobile computing device, the signal from the resistor at the amplifier, wherein the signal from the resistor comprises the known signal and the degree of thermal noise from the resistor, and wherein the degree of thermal noise is associated with the temperature of the surface.

4. The method of claim 3, wherein extracting the thermal noise from the signal from the resistor comprises performing, by the mobile computing device, a synchronous demodulation process to a signal received from the amplifier to extract the thermal noise.

5. The method of claim 4, wherein the known signal comprises a first amplitude, and wherein the signal received from the amplifier comprises a second amplitude different than the first amplitude.

6. The method of claim 3, wherein sending the known signal to an amplifier comprises sending, by the mobile computing device, the known signal to a first amplifier and a second amplifier;

wherein receiving the signal from the resistor at the amplifier comprises receiving, by the mobile computing device, the signal from the resistor at the first amplifier and the second amplifier; and wherein extracting the thermal noise from the signal from the resistor comprises:

respectively determining, by the mobile computing device, a first Fast Fourier Transform (FFT) and a second FFT for the signal from the resistor at the first amplifier and the signal from the resistor at the second amplifier; and determining, by the mobile computing device, a cross-correlation spectrum based on the first FFT and the second FFT, wherein the cross-correlation spectrum comprises the thermal noise.

7. The method of claim 1, wherein, prior to sending the known signal to the resistor of the mobile computing device, the method comprises:

generating, by the mobile computing device, the known signal using a pseudo-random noise generator, wherein the known signal comprises pseudo-random noise, and wherein the pseudo-random noise is a known noise.

8. The method of claim 7, wherein one or more bins of the second set of bins are adjacent to each bin of the first set of bins.

9. The method of claim 7, wherein the pseudo-random noise generator comprises a digital-to-analog converter (DAC) programmed to generate a known power of thermal noise spectrum.

10. A computing system, comprising:

a resistor;

one or more processors; and one or more computer-readable media that collectively store instructions that, when executed by the one or more processors, cause the computing system to perform operations, the operations comprising:

sending a known signal to the resistor, wherein the resistor is configured to directly contact a surface;

receiving a signal from the resistor, wherein the signal from the resistor comprises the known signal and a degree of thermal noise from the resistor, and wherein the degree of thermal noise is associated with a temperature of the surface;

extracting the thermal noise from the signal from the resistor; and determining the temperature of the surface based on the thermal noise extracted from the signal from the resistor;

wherein determining the temperature of the surface based on the thermal noise extracted from the signal from the resistor comprises binning, by the computing system, the signal from the resistor across a plurality of bins comprising a first set of bins and a second set of bins, wherein the first set of bins respectively correspond to a plurality of peaks of the known signal.

11. The computing system of claim 10, wherein the computing system comprises a wearable computing device, and wherein the resistor is configured to directly contact a portion of skin of a user of the wearable computing device.

12. The computing system of claim 10, wherein sending the known signal to the resistor further comprises sending the known signal to an amplifier; and wherein receiving the signal from the resistor comprises receiving the signal from the resistor at the amplifier, wherein the signal from the resistor comprises the known signal and the degree of thermal noise from the resistor, and wherein the degree of thermal noise is associated with the temperature of the surface.

13. The computing system of claim 12, wherein extracting the thermal noise from the signal from the resistor comprises performing a synchronous demodulation process to a signal received from the amplifier to extract the thermal noise.

14. The computing system of claim 13, wherein the known signal comprises a first amplitude, and wherein the signal received from the amplifier comprises a second amplitude different than the first amplitude.

15. The computing system of claim 12, wherein sending the known signal to the amplifier comprises sending the known signal to a first amplifier and a second amplifier;

wherein receiving the signal from the resistor at the amplifier comprises receiving the signal from the resistor at the first amplifier and the second amplifier; and wherein extracting the thermal noise from the signal from the resistor comprises:

respectively determining a first Fast Fourier Transform (FFT) and a second FFT for the signal from the resistor at the first amplifier and the signal from the resistor at the second amplifier; and determining a cross-correlation spectrum based on the first FFT and the second FFT, wherein the cross-correlation spectrum comprises the thermal noise.

16. The computing system of claim 10, wherein, prior to sending the known signal to the resistor, the operations comprise:

generating the known signal using a pseudo-random noise generator, wherein the known signal comprises pseudo-random noise, and wherein the pseudo-random noise is a known noise.

17. The computing system of claim 16, wherein one or more bins of the second set of bins are adjacent to each bin of the first set of bins.

18. The computing system of claim 16, wherein the pseudo-random noise generator comprises a digital-to-analog converter (DAC) programmed to generate a known power of thermal noise spectrum.

19. One or more computer-readable media that collectively store instructions that, when executed by one or more processors of a wearable computing device, cause the wearable computing device to perform operations, the operations comprising:

sending a known signal to a resistor, wherein the resistor is configured to directly contact a surface;

receiving a signal from the resistor, wherein the signal from the resistor comprises the known signal and a degree of thermal noise from the resistor, and wherein the degree of thermal noise is associated with a temperature of the surface;

extracting the thermal noise from the signal from the resistor; and determining the temperature of the surface based on the thermal noise extracted from the signal from the resistor;

wherein determining the temperature of the surface based on the thermal noise extracted from the signal from the resistor comprises binning, by the wearable computing device, the signal from the resistor across a plurality of bins comprising a first set of bins and a second set of bins, wherein the first set of bins respectively correspond to a plurality of peaks of the known signal.

20. The one or more computer-readable media of claim 19, wherein sending the known signal to the resistor further comprises sending the known signal to an amplifier; and wherein receiving the signal from the resistor comprises receiving the signal from the resistor at the amplifier, wherein the signal from the resistor comprises the known signal and the degree of thermal noise from the resistor, and wherein the degree of thermal noise is associated with the temperature of the surface.

* * * * *